(12) United States Patent
Mannepalli

(10) Patent No.: US 12,083,920 B2
(45) Date of Patent: Sep. 10, 2024

(54) SYSTEM AND METHOD FOR SCHEDULING ELECTRIC CHARGING FOR VEHICLES

(71) Applicant: Honda Motor Co., Ltd., Tokyo (JP)

(72) Inventor: Karthik Mannepalli, Torrance, CA (US)

(73) Assignee: Honda Motor Co., Ltd., Tokyo (JP)

( * ) Notice: Subject to any disclaimer, the term of this patent is extended or adjusted under 35 U.S.C. 154(b) by 644 days.

(21) Appl. No.: 17/209,552

(22) Filed: Mar. 23, 2021

(65) Prior Publication Data

US 2022/0305942 A1    Sep. 29, 2022

(51) Int. Cl.
*B60L 53/66*      (2019.01)
*B60L 53/60*      (2019.01)
(Continued)

(52) U.S. Cl.
CPC .............. *B60L 53/665* (2019.02); *B60L 53/60* (2019.02); *B60L 53/62* (2019.02); *B60L 53/63* (2019.02); *B60L 53/64* (2019.02); *B60L 53/65* (2019.02); *B60L 53/66* (2019.02); *B60L 53/68* (2019.02); *B60L 58/12* (2019.02); *G06Q 30/0283* (2013.01); *H02J 7/00032* (2020.01);
(Continued)

(58) Field of Classification Search
CPC ........ B60L 53/665; B60L 53/60; B60L 53/62; B60L 53/63; B60L 53/64; B60L 53/65; B60L 53/66; B60L 53/68; B60L 58/12; B60L 2240/70; B60L 2240/72; G06Q 30/0283; H02J 7/00032; H02J 7/0048
USPC ................................................. 320/109, 155
See application file for complete search history.

(56) References Cited

U.S. PATENT DOCUMENTS

| 7,991,665 B2 | 8/2011 | Hafner et al. |
| 8,624,719 B2 | 1/2014 | Klose et al. |

(Continued)

FOREIGN PATENT DOCUMENTS

| CN | 108327567 A | 7/2018 |
| CN | 109398149 A | 3/2019 |

(Continued)

OTHER PUBLICATIONS

"UK launches first electric vehicle smart charging marketplace trial", Intelligent Transport, Jul. 19, 2019, 5 Pages.
(Continued)

*Primary Examiner* — Richard Isla
*Assistant Examiner* — Manuel Hernandez
(74) *Attorney, Agent, or Firm* — Suzanne Gagnon; American Honda Motor Co., Inc.

(57) ABSTRACT

A server for scheduling electric charging for vehicles is provided. The server receives vehicle charging information associated with a plurality of electric vehicles. The vehicle charging information includes at least one of: first information related to a location of charging, second information related to a time period of charging, or third information related to state-of-charge (SOC). The server determines, based on the received vehicle charging information, a set of electric vehicles from the plurality of electric vehicles. The server further determines a charging schedule for each of the determined set of electric vehicles based on one or more charging criterions. The server further transmits one or more charging control instructions to each of the determined set of electric vehicles, based on the determined charging schedule.

16 Claims, 8 Drawing Sheets

(51) Int. Cl.
   *B60L 53/62* (2019.01)
   *B60L 53/63* (2019.01)
   *B60L 53/64* (2019.01)
   *B60L 53/65* (2019.01)
   *B60L 53/68* (2019.01)
   *B60L 58/12* (2019.01)
   *G06Q 30/0283* (2023.01)
   *H02J 7/00* (2006.01)

(52) U.S. Cl.
   CPC ......... *H02J 7/0048* (2020.01); *B60L 2240/70* (2013.01); *B60L 2240/72* (2013.01)

(56) References Cited

U.S. PATENT DOCUMENTS

| | | | |
|---|---|---|---|
| 8,918,376 B2 | 12/2014 | Ambrosio et al. | |
| 9,024,580 B2 | 5/2015 | Wu et al. | |
| 9,674,771 B2* | 6/2017 | Bridges | B60L 53/62 |
| 9,758,046 B2 | 9/2017 | Harper et al. | |
| 2008/0281663 A1* | 11/2008 | Hakim | H02J 3/466 |
| | | | 705/7.25 |
| 2011/0072112 A1 | 3/2011 | Kaplan | |
| 2013/0211988 A1* | 8/2013 | Dorn | B60L 53/65 |
| | | | 700/297 |
| 2013/0217409 A1* | 8/2013 | Bridges | H02J 3/381 |
| | | | 455/456.1 |
| 2017/0088001 A1 | 3/2017 | Haas et al. | |
| 2018/0065494 A1* | 3/2018 | Mastrandrea | G06Q 10/02 |
| 2019/0184844 A1 | 6/2019 | Uyeki et al. | |
| 2021/0053459 A1* | 2/2021 | Tsuchiya | H01M 10/441 |
| 2024/0027983 A1* | 1/2024 | Okubo | G06Q 50/06 |
| 2024/0037597 A1* | 2/2024 | Yumita | B60L 55/00 |

FOREIGN PATENT DOCUMENTS

| | | |
|---|---|---|
| CN | 109523646 A | 3/2019 |
| WO | 2019061240 A1 | 4/2019 |

OTHER PUBLICATIONS

IRENA, "Smart Charging For Electric Vehicles", International Renewable Energy Agency, 2019, 138 pages.

* cited by examiner

SYSTEM AND METHOD FOR SCHEDULING ELECTRIC CHARGING FOR VEHICLES

BACKGROUND

Generally, electric vehicles are charged and used for transportation purposes. For example, the electric vehicles may be charged from electric charging facility devices (such as charging devices or stations) located at a public location (such as a gas station or a home location). Typically, there may be an electricity cost that may be incurred for charging the electric vehicles. At times, there may be additional electrical entities (such as different electrical appliances at home, industries, offices, public area, and the like) which may also consume electricity at a same time of charging the electric vehicles. In such scenario, there may be variations in the electric power demands between such additional electrical entities and the electric vehicles. Because of such variations in the electric power demands, there may be an additional electricity cost that may be incurred for charging the electric vehicles. Further, in certain situations, the electrical vehicles are not charged in optimal manner which may either lead to increase in the electricity cost for charging or lead to unavailability of the electrical charge for other electrical vehicles.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

According to an embodiment of the disclosure, a server for scheduling electric charging for vehicles is provided. The server may include circuitry that may receive vehicle charging information associated with a plurality of electric vehicles. The vehicle charging information may include at least one of: first information related to a location of charging, second information related to a time period of charging, or third information related to state-of-charge (SOC). The circuitry may determine, based on the received vehicle charging information, a set of electric vehicles from the plurality of electric vehicles. The circuitry may further determine a charging schedule for each of the determined set of electric vehicles based on one or more charging criterions. The circuitry may further transmit one or more charging control instructions to each of the determined set of electric vehicles, based on the determined charging schedule.

According to another embodiment of the disclosure, a method for scheduling electric charging for vehicles is provided. The method may include receiving vehicle charging information associated with a plurality of electric vehicles. The vehicle charging information may include at least one of: first information related to a location of charging, second information related to a time period of charging, or third information related to state-of-charge (SOC). The method may further include determining, based on the received vehicle charging information, a set of electric vehicles from the plurality of electric vehicles. The method may further include determining a charging schedule for each of the determined set of electric vehicles based on one or more charging criterions. The method may further include transmitting one or more charging control instructions to each of the determined set of electric vehicles, based on the determined charging schedule.

According to an embodiment of the disclosure, a non-transitory computer-readable medium is provided. The non-transitory computer-readable medium may store thereon, computer-executable instructions which, when executed by an electronic apparatus, cause the electronic apparatus to execute operations. The operations may include receiving vehicle charging information associated with a plurality of electric vehicles. The vehicle charging information may include at least one of: first information related to a location of charging, second information related to a time period of charging, or third information related to state-of-charge (SOC). The operations may further include determining, based on the received vehicle charging information, a set of electric vehicles from the plurality of electric vehicles. The operations may further include determining a charging schedule for each of the determined set of electric vehicles based on one or more charging criterions. The operations may further include transmitting one or more charging control instructions to each of the determined set of electric vehicles, based on the determined charging schedule.

Figure 1:
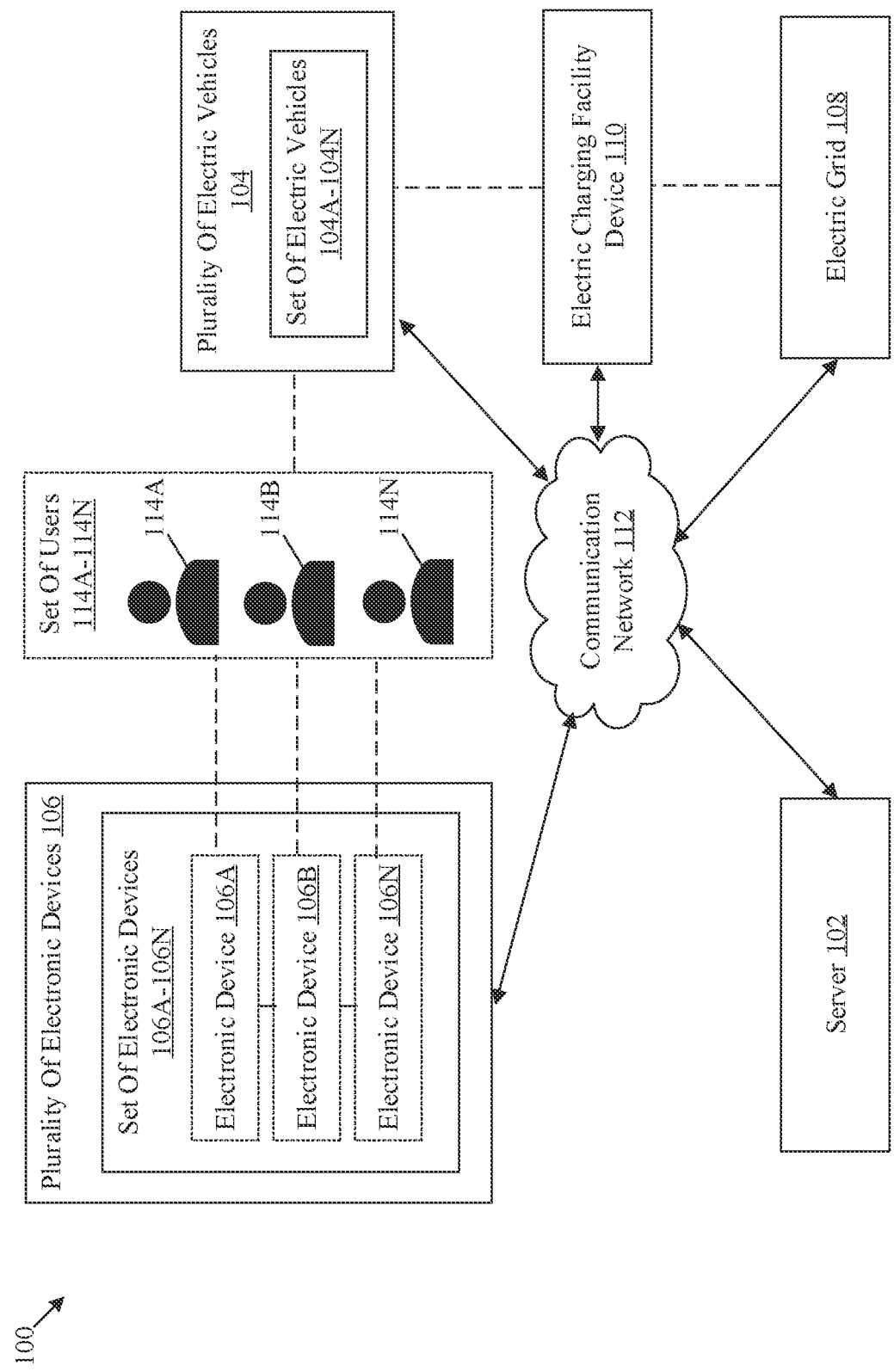
FIG. 1 is a block diagram that illustrates an exemplary network environment for scheduling electric charging for vehicles, in accordance with an embodiment of the disclosure.

The foregoing summary, as well as the following detailed description of the present disclosure, is better understood when read in conjunction with the appended drawings. For the purpose of illustrating the present disclosure, exemplary constructions of the preferred embodiment are shown in the drawings. However, the present disclosure is not limited to the specific methods and structures disclosed herein. The description of a method step or a structure referenced by a numeral in a drawing is applicable to the description of that method step or structure shown by that same numeral in any subsequent drawing herein.

DETAILED DESCRIPTION

The following described implementations may be found in a server for scheduling electric charging for vehicles. Exemplary aspects of the disclosure may include a server that may be configured to receive vehicle charging information (such as information about a location of charging, a time period of charging, or a state-of-charge (SOC) before start and end of charging) associated with a plurality of electric vehicles. The vehicle charging information may indicate a charging pattern of the plurality of electric vehicles (or charging behavior or preference of users of the plurality of electric vehicles). Based on the received vehicle charging information from the plurality of electric vehicles, the server may determine an optimal charging schedule for at least one selected vehicle of the plurality of electric vehicles. In an embodiment, the charging schedule may relate to charging of the selected vehicle when there is a minimal electric power consumption or requirement from other electrical entities (such as electrical appliances at home, industries, offices, public areas, and the like) or when the electric charging is less in demand. Therefore, based on the determined charging schedule, the selected vehicle may reduce an electricity cost for charging.

In some cases, some of the plurality of electric vehicles may be unaware of benefits (such as cost-saving in the electric charging cost). Further, the charging patterns (i.e., indicated by the vehicle charging information) of such vehicles may indicate that the electric charging is not optimal and may incur higher charging cost. In such cases, the server may determine a set of such electric vehicles from the plurality of electric vehicles based on the received vehicle charging information from the plurality of electric vehicles. The server may further transmit charging subscription information (such as a subscription request for a pre-determined time period) to an electronic device (such as a mobile phone) associated with each of the determined set of electric vehicles. The transmitted charging subscription information may indicate the benefits (such as cost-saving in the electric charging) to the determined set of electric vehicles.

The server may further receive acceptance information (such as an acceptance of the subscription request for the pre-determined time period or for an unlimited period) from the electronic device associated with each of the determined set of electric vehicles. Based on the received acceptance information, the server may further determine the optimal charging schedule for each of the determined set of electric vehicles based on one or more charging criterions (such as, but not limited to, the location of charging, a number of electric vehicles present at the location to indicate the demand of charging, the time period of charging, the SOC, or number of electric grids or available electric power sources at the location). The server may further transmit one or more charging control instructions (such as start/stop commands for charging) to each of the determined set of electric vehicles, based on the determined optimal charging schedule. The electric charging of the set of electric vehicles based on the determined charging schedule may further reduce the cost of charging. Therefore, the optimal charging schedule determined by the server may be referred as a smart charging schedule (or program) for the set of electric vehicles. The server may further transmit summary information (such as an amount of cost saved based on the charging schedule) to the electronic device associated with each of the determined set of electric vehicles. Such summary information may be beneficial for a user of the electronic device to understand advantages associated with the charging schedule determined by the server.

Therefore, the server may facilitate the optimal charging schedule that may reduce the additional electric charging cost, which may be incurred for charging the plurality of electric vehicles during the time of high charging cost. Further, even if some of the plurality of electric vehicles may be unaware of benefits of the optimal charging schedule, the transmission of charging subscription information from the server may help the users of such electric vehicles to understand the benefits of the optimal charging schedule (i.e., smart charging). Additionally, the server may transmit the summary information (such as including the amount of cost saved based on the charging schedule) to the electronic device associated with each of the determined set of electric vehicles, such that the users of the set of electric vehicles may understand a profit associated with the charging schedule determined by the server.

Reference will now be made in detail to specific aspects or features, examples of which are illustrated in the accompanying drawings. Wherever possible, corresponding, or similar reference numbers will be used throughout the drawings to refer to the same or corresponding parts.

FIG. 1 is a block diagram that illustrates an exemplary network environment for scheduling electric charging for vehicles, in accordance with an embodiment of the disclosure. There is shown a network environment 100 which may include a server 102. The server 102 may be communicatively coupled with a plurality of electric vehicles 104, a plurality of electronic devices 106, an electric grid 108, an electric charging facility device 110, through a communication network 112. The plurality of electric vehicles 104 may include a set of electric vehicles 104A-104N. The plurality of electronic devices 106 may include a set of electronic devices 106A-106N. Each of the set of electronic devices 106A-106N may be associated with a set of users 114A-114N. Modifications, additions, or omissions may be made to FIG. 1 without departing from the scope of the present disclosure. For example, the network environment 100 may include more or fewer elements than those illustrated and described in the present disclosure. For instance, in some embodiments, the network environment 100 may not include the electric grid 108, without deviation from the scope of the disclosure. Further, rather than one electric charging facility device 110, the network Interface 208 may include a plurality of electric charging facility devices.

The server 102 may include suitable logic, circuitry, interfaces, and/or code that may be configured receive vehicle charging information associated with the plurality of electric vehicles 104. The vehicle charging information may include at least one of: first information related to a location of charging (such as a geo-location of each of the plurality of electric vehicles 104), second information related to a time period of charging (such as a duration of charging or original time schedule of charging of each of the plurality of electric vehicles 104), or third information related to state-of-charge (such as a battery percentage at the start or end of charging of each of the plurality of electric vehicles 104). The server 102 may further configured to communicate between the plurality of electric vehicles 104, the plurality of electronic devices 106, the electric grid 108, and the electric charging facility device 110, via the communication network 112, to optimally control the electric charging of one or more of the plurality of electric vehicles 104. The control of electric charging may include, but is not limited to, a determination of the set of electric vehicles 104A-104N from the plurality of electric vehicles 104 based on the received vehicle charging information, a determination of a charging schedule for each of the determined set of electric vehicles 104A-104N based on one or more charging criterions (such as, but not limited to, the location of charging, the time period of charging, or the SOC), and a transmission of one or more charging control instructions (such as start/stop commands for charging the set of electric vehicles 104A-104N) to each of the determined set of electric vehicles 104A-104N, based on the determined charging schedule. Details of such optimal control of electric charging are further described, for example in FIGS. 3, 4, and 5A-5B.

In some embodiments, the server 102 may be implemented as a cloud server, which may be utilized to execute various operations through web applications, cloud applications, HTTP requests, repository operations, file transfer, and the like. Examples of the server 102 may include, but are not limited to, an event server, a database server, a file server, a web server, a media server, a content server, an application server, a mainframe server, or a combination thereof. In one or more embodiments, the server 102 may be implemented as a plurality of distributed cloud-based resources. In some embodiments, the server 102 may be a handheld or a portable device. The examples of the server 102 may also include, but are not limited to, a computing device, a mainframe machine, a computer work-station, a smartphone, a cellular phone, a mobile phone, and/or any electronic device with data processing and networking capabilities.

The plurality of electric vehicles 104 may be configured to receive the electric charge and use such electric charge for the transportation of the plurality of electric vehicles 104 or to control different electronic or electrical components/devices of the plurality of electric vehicles 104. To receive the electric charge, the plurality of electric vehicles 104 may communicate or connect with at least one electric charging facility device 110. Each of the plurality of electric vehicles 104 may include a battery (not shown) to store the electric charge received from the corresponding electric charging facility device 110. The plurality of electric vehicles 104 may be a non-autonomous, a semi-autonomous, or an autonomous vehicle. Examples of the plurality of electric vehicles 104 may include, but are not limited to, a two-wheeler vehicle, a three-wheeler vehicle, a four-wheeler vehicle, a vehicle with higher number of wheels, a hybrid vehicle.

In an embodiment, the plurality of electric vehicles 104 may include the set of electric vehicles 104A-104N. The server 102 may determine the set of electric vehicles 104A-104N based on the received vehicle charging information. The set of electric vehicles 104A-104N may include a first electric vehicle 104A, a second electric vehicle 104B, and a Nth electric vehicle 104N. The number of electric vehicles shown in FIG. 1 is presented merely as an example. The set of electric vehicles 104A-104N may include only one electric vehicle or more than one electric vehicle, without deviation from the scope of the disclosure. Details of such determination of the set of electric vehicles 104A-104N are further described, for example, in FIGS. 3 and 4. Each of the set of electric vehicles 104A-104N may be associated with the plurality of electronic devices 106.

The plurality of electronic devices 106 may be configured to communicate with the server 102, via the communication network 112, for electric charge scheduling of each of the set of electric vehicles 104A-104N. The plurality of electronic devices 106 may include suitable logic, circuitry, interfaces, and/or code that may be configured to communicate with the server 102 on behalf of the plurality of electric vehicles 104, via the communication network 112. In an embodiment, each of the plurality of electronic devices 106 may be configured to transmit the vehicle charging information to the server 102. The vehicle charging information may indicate the charge pattern of the plurality of electric vehicles 104. In an embodiment, the plurality of electronic devices 106 may include the set of electronic devices 106A-106N.

The set of electronic devices 106A-106N may be associated with the set of electric vehicles 104A-104N. The set of electronic devices 106A-106N may include suitable logic, circuitry, interfaces, and/or code that may be configured to communicate with the server 102 on behalf of the set of electric vehicles 104A-104N, via the communication network 112. The set of electronic devices 106A-106N may include a first electronic device 106A, a second electronic device 106B, and a Nth electronic device 106N. Each of the set of electronic devices 106A-106N may be associated with the corresponding electric vehicle of the set of electric vehicles 104A-104N. Further, each of the set of electronic devices 106A-106N may be associated with the set of users 114A-114N of the set of electric vehicles 104A-104N. In one example, the first electronic device 106A may be associated with a first user 114A from the set of users 114A-114N, where the first user 114A may be associated with the first electric vehicle 104A. The first user 114A may be an owner or a driver of the first electric vehicle 104A. Similarly, the second electronic device 106B may be associated with a second user 114B from the set of users 114A-114N, where the second user 114B may be associated with the second electric vehicle 104B. Further, the Nth electronic device 106N may be associated with a Nth user 114N from the set of users 114A-114N, where the Nth user 114N may be associated with the Nth electric vehicle 104N. The number of electronic devices shown in FIG. 1 is presented merely as an example. The set of electronic devices 106A-106N may include only one electronic device or more than one electronic device to communicate with the server 102, without deviation from the scope of the disclosure.

In an embodiment, the set of electronic devices 106A-106N may be configured perform operations, which may include, but not limited to: transmission of the vehicle charging information to the server 102, reception of charging subscription information (as described in 306 of FIG. 3) from the server 102, transmission of acceptance information (as described at 308 of FIG. 3) to the server 102, and reception of summary information (as described at 316 of FIG. 3) from the server 102. The operations may further include, but is not limited to, transmission of charging preference information (as described at 520 of FIG. 5B) to the server 102, or transmission of a scheduling request (as described in 604 of FIG. 6) to the server 102. Details of the communication between the set of electronic devices 106A-106N and the server 102 are further described, for example in FIGS. 3, 5B, and 6.

In an embodiment, the set of electronic devices 106A-106N may be a set of portable devices that may be associated with the set of users 114A-114N (i.e., owners or driver) of the set of electric vehicles 104A-104N. The set of portable devices may include suitable logic, circuitry, interfaces and/or code that may be configured to render at least an audio-based data, a video-based data, and/or a user interface to the set of users 114A-114N of the set of electric vehicles 104A-104N. The set of portable devices may be configured to execute one or more operations associated with each of the set of electric vehicles 104A-104N. The operations may include, but are not limited to, rendering of the charging schedule, rendering of the charging subscription information, reception of charging preference, or rendering of the summary information. Examples of the set of portable devices may include, but are not limited to, a computing device, a smartphone, a cellular phone, a mobile phone, a gaming device, a camera device, a computer work-station, a personal digital assistant (PDA) and/or a consumer electronic (CE) device.

In another embodiment, the set of electronic devices 106A-106N may be an in-vehicle infotainment system that may be integrated within each of the set of electric vehicles 104A-104N. The in-vehicle infotainment system may include suitable logic, circuitry, interfaces and/or code that may be configured to render at least an audio-based data, a video-based data, and/or a user interface to the set of users 114A-114N of the set of electric vehicles 104A-104N. Examples of the in-vehicle infotainment system may include, but are not limited, an entertainment system, a navigation system, a vehicle user interface (UI) system, an Internet-enabled communication system, and other entertainment systems. In some embodiments, each of the set of electronic devices 106A-106N may be an electronic control unit (ECU) of each of the set of electric vehicles 104A-104N.

The electric grid 108 may include suitable logic, circuitry, or interfaces that may be configured to manage and transfer electric charge, from the electric grid 108, to electric devices (such as the electric charging facility device 110 or other electrical appliances). The electric grid 108 may be a managed network of high voltage (HV) power transmission lines, sub-stations, low voltage (LV) distribution lines, and generation facilities (such as power plants). Although there is only one electric grid 108 shown in FIG. 1, it may be noted that there may be a plurality of electric grids, which may be communicably coupled to deliver electric charge to the electrical devices (such as the electric charging facility device 110). Example of the electric grid 108 may include, but are not limited to, a micro-grid, a national grid, a smart grid, and other electric energy generation facilities. The electric grid 108 may be configured to deliver the electric energy to the electric charging facility device 110, through various transmission and distribution lines.

The electric charging facility device 110 may include suitable logic, circuitry, and/or interfaces that may be configured to transfer electric energy between the electric grid 108 and each of the set of electric vehicles 104A-104N. Although there is only one electric charging facility device 110 shown in the FIG. 1, it may be noted that there may be a plurality of electric charging facility devices, which may be communicably coupled to each of the set of electric vehicles 104A-104N to transfer electric energy between the electric grid 108 and each of the set of electric vehicles 104A-104N. The electric charging facility device 110 may be configured to control, process, and monitor the electric energy transferred between each of the set of electric vehicles 104A-104N and the electric grid 108. In some embodiments, the electric charging facility device 110 may store the electric energy received either from the electric grid 108 or from the plurality of electric vehicles 104, and further transfer the electrical charge to each of the set of electric vehicles 104A-104N, respectively.

In an embodiment, the electric charging facility device 110 may be located in a public location (such as public parks, gas stations, etc.) to transfer the electric energy to each of the set of electric vehicles 104A-104N, via an electrical transmission line (such as a charging cable, a wireless charging link, or the like). In another embodiment, the electric charging facility device 110 may be located in a private location (such as a charging adapter located at a home of the user) to transfer the electric energy to each of the set of electric vehicles 104A-104N, via an electrical transmission line (such as a charging cable, a wireless charging link, or the like). Examples of the electric charging facility device 110 may include, but are not limited to an electric vehicle (EV) charging station, an electric recharging point, an electronic charging station, an electric vehicle supply equipment (EVSE), a Direct Current (DC) fast charging station, a home electric charging station, a domestic electrical socket, a level 1 charging station, a level 2 charging station, or a level 3 charging station.

The communication network 112 may include a communication medium through which the server 102, the plurality of electric vehicles 104, the plurality of electronic devices 106, the electric grid 108, and the electric charging facility device 110 may communicate with each other. The communication network 112 may be one of a wired connection or a wireless connection. Examples of the communication network 112 may include, but are not limited to, the Internet, a cloud network, a Wireless Fidelity (Wi-Fi) network, a Personal Area Network (PAN), a Local Area Network (LAN), or a Metropolitan Area Network (MAN). Various devices in the network environment 100 may be configured to connect to the communication network 112 in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols.

In operation, the server 102 may be configured to receive vehicle charging information (such as the location of charging, the time period of charging, or the SOC at start or end of charging) associated with the plurality of electric vehicles 104. In some embodiments, the plurality of electric vehicles 104 may upload respective vehicle charging information to the server 102. In some embodiments, the server 102 may receive the vehicle charging information from the plurality of electronic devices 106 associated with the corresponding plurality of electric vehicles 104. Based on the received vehicle charging information, the server 102 may determine a charging schedule for one or more electric vehicles of the plurality of electric vehicles 104. The charging schedule may relate to a time period for charging the one or more electric vehicles when the charging cost may be low or when the electric charging demand may be low or when there is a minimal electric power consumption or requirement from other electrical entities (such as electric appliance at home, industries, offices, public places, and the like). Therefore, based on the determined charging schedule, the one or more selected electric vehicles may reduce the charging cost. Details of the charging schedule are further explained, for example, in FIG. 3.

In accordance with an embodiment, the server 102 may be configured to determine the set of electric vehicles 104A-104N from the plurality of electric vehicles 104 based on the received vehicle charging information. The determination of the set of electric vehicles 104A-104N is further explained, for example, in FIG. 4. The server 102 may further transmit charging subscription information (such as a subscription request) to the set of electronic devices 106A-106N associated with each of the determined set of electric vehicles 104A-104N. The transmission of charging subscription information may indicate the benefits (such as cost-saving) of the charging schedule determined by the server 102. The transmission of the charging subscription information to the set of electric vehicles 104A-104N is further explained, for example, at 308 of FIG. 3.

The server 102 may further receive acceptance information (such as an acceptance of the subscription request) from the set of electronic devices 106A-106N associated with each of the determined set of electric vehicles 104A-104N. Based on the received acceptance information, the server 102 may further determine the charging schedule for each of the determined set of electric vehicles 104A-104N based on one or more charging criterions. The details of the one or more charging criterions are further described, for example, in FIGS. 5A-5B.

The server 102 may further transmit one or more charging control instructions (such as start or stop commands for charging) to each of the determined set of electric vehicles 104A-104N, based on the determined charging schedule. The server 102 may further transmit summary information (such as an amount of cost saved based on the charging schedule) to the each of the set of electronic devices 106A-106N associated with each of the determined set of electric vehicles 104A-104N. Such summary information may be beneficial for each of the set of users 114A-114N associated with the each of the set of electronic devices 106A-106N to understand a profit associated with the charging schedule. The description of the summary information is further described, for example, in FIG. 3.

Figure 2:
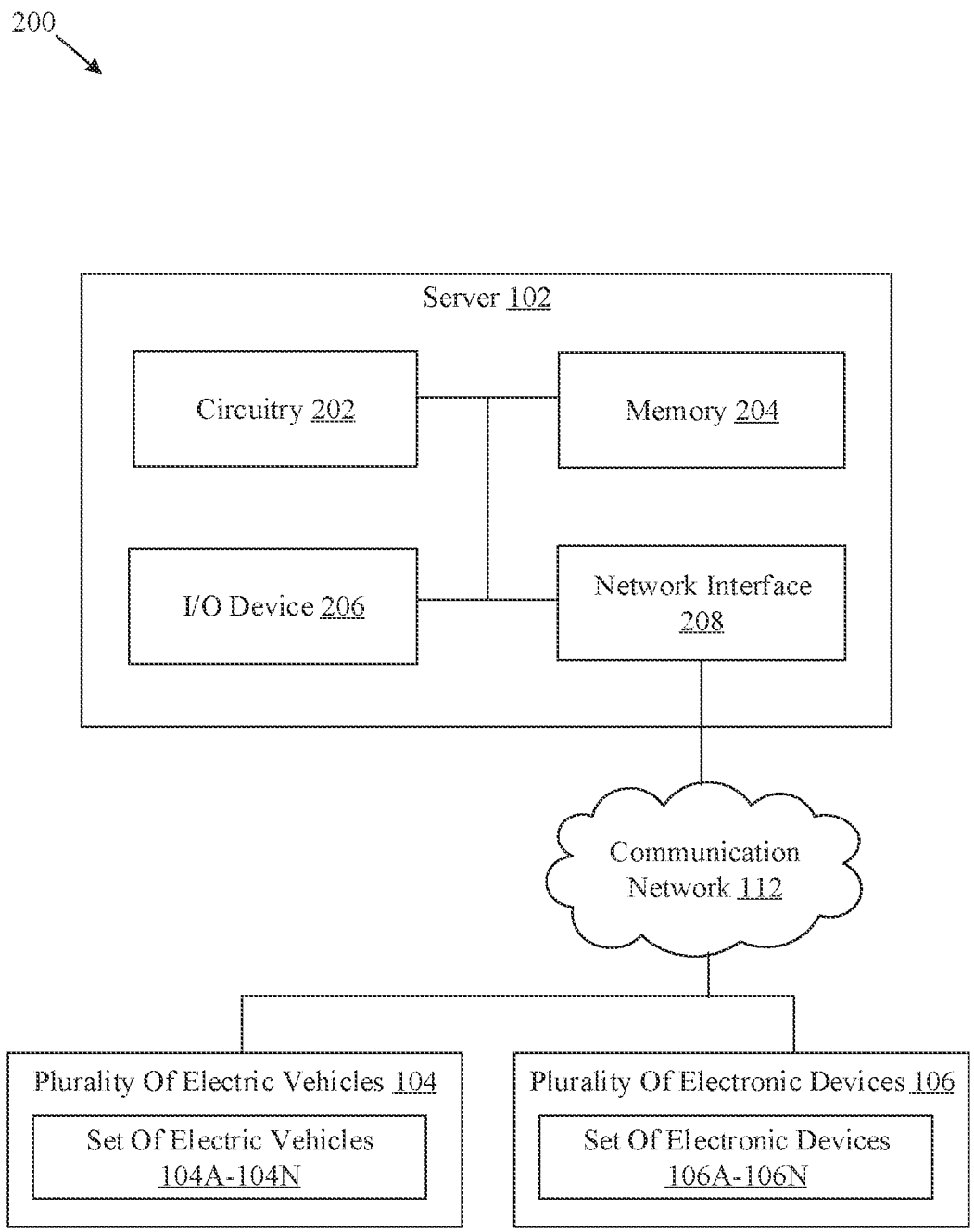
FIG. 2 is a block diagram that illustrates an exemplary server of FIG. 1 for scheduling electric charging for vehicles, in accordance with an embodiment of the disclosure.

FIG. 2 is a block diagram that illustrates an exemplary server of FIG. 1 for scheduling electric charging for vehicles, in accordance with an embodiment of the disclosure. FIG. 2 is explained in conjunction with elements from FIG. 1. With reference to FIG. 2, there is shown a block diagram 200 of the server 102. The server 102 may include circuitry 202, a memory 204, an I/O device 206, and a network interface 208. The circuitry 202 may be coupled to the memory 204, the I/O device 206, and the network interface 208, through wired or wireless connections of the server 102.

The circuitry 202 may include suitable logic, circuitry, and/or interfaces that may be configured to execute program instructions associated with different operations to be executed by the server 102. For example, some of the operations may include, but are not limited to, reception of the vehicle charging information from the plurality of electric vehicles 104, determination of the set of electric vehicles 104A-104N from the plurality of electric vehicles 104 based on the received vehicle charging information, determination of a charging schedule for each of the determined set of electric vehicles 104A-104N based on one or more charging criterions, and transmission of one or more charging control instructions for charging the set of electric vehicles 104A-104N based on the determined charging schedule. Details of such operations are further explained, for example in FIGS. 3, 4, and 5A-5B. The operations may further include transmission of the charging subscription information to the set of electric vehicles 104A-104N, reception of the acceptance information, reception of charging preference information from one or more of the set of electronic devices 106A-106N, reception of a scheduling request, and the transmission of summary information to the set of electronic devices 106A-106N. Details of such operations are further described, for example in FIGS. 3, 5B, and 6.

The circuitry 202 may include any suitable special-purpose or general-purpose computer, computing entity, or processing device including various computer hardware or software modules and may be configured to execute instructions stored on any applicable computer-readable storage media (for example the memory 204). The circuitry 202 may be implemented based on a number of processor technologies known in the art. For example, the circuitry 202 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. The circuitry 202 may include any number of processors configured to, individually or collectively, perform any number of operations of the server 102, as described in the present disclosure. Examples of the circuitry 202 may include a Central Processing Unit (CPU), a Graphical Processing Unit (GPU), an x86-based processor, an x64-based processor, a Reduced Instruction Set Computing (RISC) processor, a Complex Instruction Set Computing (CISC) processor, and/or other hardware processors.

The memory 204 may include suitable logic, circuitry, interfaces, and/or code that may be configured to store the set of instructions executable by the circuitry 202. The memory 204 may be configured to store the vehicle charging information received from the plurality of electric vehicles 104. The memory 204 may be further configured to information associated with the determined set of electric vehicles 104A-104N. The memory 204 may be further configured to store information associated with the determined charging schedule for each for the determined set of electric vehicles 104A-104N. In an embodiment, the memory 204 may be further configured to store information associated with the subscription information and the corresponding acceptance information received from the set of electronic devices 106A-106N based on the transmitted subscription information. The memory 204 may be further configured to store information related to the charging control instructions transmitted to the set of electric vehicles 104A-104N for charging. The memory 204 may be further configured to store information associated with the summary information. Details of such information is described further, for example, in FIG. 3. Examples of implementation of the memory 204 may include, but are not limited to, Random Access Memory (RAM), Read Only Memory (ROM), Hard Disk Drive (HDD), a Solid-State Drive (SSD), a CPU cache, and/or a Secure Digital (SD) card.

The I/O device 206 may include suitable logic, circuitry, interfaces, and/or code that may be configured to receive user inputs and generate outputs in response to the received user inputs. The I/O device 206 may receive registration information associated with registration of at least one of: a new electric vehicle, or a new electronic device, a new electric grid, or even a new electric charging facility device, as a user-input. The registration information may indicate a unique identifier or a location associated with one of the new electric vehicle, the new electronic device, the new electric grid, or even the new electric charging facility device. In an example, the server 102 may receive the user-input from an executive of the organization associated with or handling the server 102 for scheduling electric charging for the set of electric vehicles 104A-104N. The I/O device 206 may include various input and output devices, may be configured to communicate with the circuitry 202. Examples of the I/O device 206 may include, but are not limited to, a touch screen, a keyboard, a mouse, a joystick, a microphone, a display device, a speaker, and/or an image sensor.

The network interface 208 may include suitable logic, circuitry, and interfaces that may be configured to facilitate communication between the circuitry 202, the plurality of electric vehicles 104, the plurality of electronic devices 106, the electric grid 108, and the electric charging facility device 110, via the communication network 112. The network interface 208 may be implemented by use of various known technologies to support wired or wireless communication of the server 102 with the communication network 112. The network interface 208 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer circuitry. The network interface 208 may be configured to communicate via wireless communication with networks, such as the Internet, an Intranet or a wireless network, such as a cellular telephone network, a wireless local area network (LAN), and a metropolitan area network (MAN). The wireless communication may be configured to use one or more of a plurality of communication standards, protocols and technologies, such as Global System for Mobile Communications (GSM), Enhanced Data GSM Environment (EDGE), wideband code division multiple access (W-CDMA), Long Term Evolution (LTE), code division multiple access (CDMA), time division multiple access (TDMA), Bluetooth, Wireless Fidelity (Wi-Fi) (such as IEEE 802.11a, IEEE 802.11b, IEEE 802.11g or IEEE 802.11n), voice over Internet Protocol (VoIP), light fidelity (Li-Fi), Worldwide Interoperability for Microwave Access (Wi-MAX), a protocol for email, instant messaging, and a Short Message Service (SMS).

Although in FIG. 2, it is shown that the server 102 includes the circuitry 202, the memory 204, the I/O device 206, and the network interface 208; the disclosure may not be limiting and the server 102 may include more or less components to perform the same or other functions of the server 102. Details of the other functions and the components have been omitted from the disclosure for the sake of brevity. The functions or operations executed by the server 102, as described in FIG. 1, may be performed by the circuitry 202. Operations executed by the circuitry 202 are described, for example, in the FIGS. 3, 4, 5A-5B, and 6.

Figure 3:
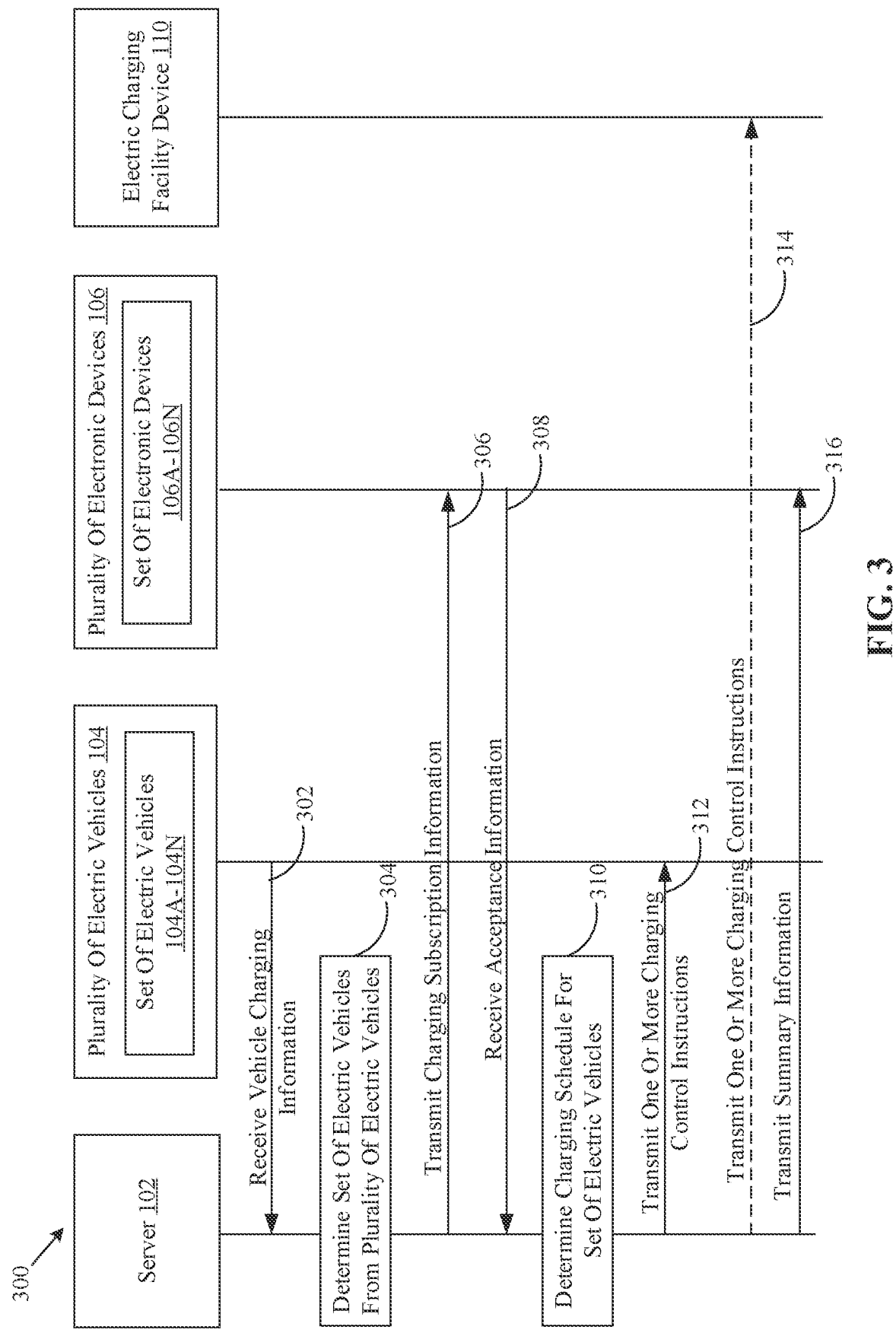
FIG. 3 is a sequence diagram that illustrates exemplary operations for scheduling electric charging for vehicles by the server of FIG. 1, in accordance with an embodiment of the disclosure.

FIG. 3 is a sequence diagram that illustrates exemplary operations for scheduling electric charging for vehicles by the server of FIG. 1, in accordance with an embodiment of the disclosure. FIG. 3 is explained in conjunction with elements from FIG. 1 and FIG. 2. With reference to FIG. 3, there is shown a sequence diagram 300 of exemplary operations handled by the server 102 or the circuitry 202 for scheduling electric charging for the set of electric vehicles 104A-104N. In FIG. 3, the server 102 or the circuitry 202 performs the exemplary operations from 302 to 316, which relates to scheduling electric charging (i.e., for example an optimal or smart charging schedule) for the set of electric vehicles 104A-104N.

At 302, vehicle charging information may be received. In an embodiment, the server 102 or the circuitry 202 may be configured to receive the vehicle charging information from the plurality of electric vehicles 104. For example, the vehicle charging information may be received from the in-vehicle infotainment system or from the electronic control unit (ECU) of each of the plurality of electric vehicles 104. In another embodiment, the vehicle charging information related to the plurality of electric vehicles 104 may be received from the plurality of electronic devices 106 associated with the plurality of electric vehicles 104. In other words, the plurality of electronic devices 106 may upload the vehicle charging information of the plurality of electric vehicles 104 on the server 102. In some embodiments, one or more electric vehicles of the plurality of electric vehicles 104 or one or more electronic devices may upload the vehicle charging information during charging the corresponding vehicle or may upload the vehicle charging information after the current charging session. In one embodiment, the vehicle charging information may be stored in the memory 204 of the server 102. In another embodiment, the vehicle charging information may be retrieved from a database associated with the server 102.

The vehicle charging information received from a particular electric vehicle (or electronic device) may indicate information about the electric charging being performed for the electric vehicle by an electric charging facility device (such as the electric charging facility device 110). The vehicle charging information may indicate the charging pattern of the particular electric vehicle or charging behavior of a user (such as first user 114A) to charge the corresponding electric vehicle. Thus, the vehicle charging information may include at least one of the first information related to the location of charging, the second information related to the time period of charging, or the third information related to the state-of-charge (SOC). The first information related to the location of charging may indicate a geo-location at which the electric charging may be performed for the particular electric vehicle. The location may be of the electric vehicle, the associated electronic device, or the associated electric charging facility device 110. For example, the location of the electric vehicle or the electric charging facility device may indicate, but is not limited to, an address, a ZIP code, a GPS coordinate, latitude-longitude information, a name of street, a name of town, a name of city or state.

The second information related to the time period of charging may indicate a duration or time period of charging the electric vehicle that may be measured by at least one of the electric vehicle, the associated electronic device, or the electric charging facility device 110. In an example, the second information may indicate that generally the electric vehicle may be charged daily for two hours in the morning time (i.e., 6:00 AM to 8:00 AM) or for four hours at the night time (i.e., 8:00 PM to 12:00 AM). In another example, the second information may indicate that the electric vehicle is charged after every six hours for one hour duration. In another example, the second information may indicate that the electric vehicle may be charged on weekly basis for continues eight hours duration. The third information related to the state-of-charge may indicate the state of charge (SOC) of a battery (i.e., percentage of charge of the battery) of the electric vehicle 104, that may be measured by at least one of the electric vehicles, the associated electronic device, or the electric charging facility device 110. In an embodiment, the third information may indicate the SOC before charging and/or the SOC at the end of charging of the electric vehicle. For example, the third information may indicate that the electric vehicle has been charged from 20% SOC to 80% SOC on daily basis. In another example, the third information may indicate the electric vehicle is always charged till 100% SOC. In another example, the third information may indicate that the electric vehicle is not charged until the SOC reaches 30% of battery capacity of the electric vehicle. Therefore, the vehicle charging information received from different plurality of electric vehicles 104 may indicate the charging pattern or charging behavior of the corresponding electric vehicle based on the first information, second information, and/or the third information included in the vehicle charging information. In some embodiments, the electric vehicle or the corresponding electronic device may store the vehicle charging information in in-built memory (not shown) indicating information related to past charging session for a particular duration (say last certain days, weeks, or months). In some embodiments, the server 102 may receive the vehicle charging information for the plurality of electric vehicles 104 from corresponding electric charging facility devices (such as electric charging facility device 110).

At 304, the set of electric vehicles 104A-104N may be determined. Based on the received vehicle charging information, the server 102 may determine the set of electric vehicles 104A-104N from the plurality of electric vehicles 104 for the determination of the charging schedule (i.e., optimal or smart charging schedule). The set of electric vehicles 104A-104N may be a subset of the plurality of electric vehicles 104. In an embodiment, the set of electric vehicles 104A-104N may be same as the plurality of electric vehicles 104 from which the vehicle charging information is received by the server 102. In an embodiment, based on the location of charging (i.e., first information), the set of electric vehicles 104A-104N may be determined. For example, the server 102 may determine the set of electric vehicles 104A-104N from the plurality of electric vehicles 104 which may be charged at a particular location (such as all the set of electric vehicles 104A-104N may belong to same location, like same street, town or city).

In another embodiment, based on the state-of-charge (i.e., third information), the set of electric vehicles 104A-104N may be determined. For example, the electric vehicles of the plurality of electric vehicles 104 which may have a larger range of SOC between the start and the end of charging may be selected as the set of electric vehicles 104A-104N. For example, the plurality of electric vehicles 104 which normally get charged between 20% SOC to 90% SOC (i.e., SOC over a threshold range) may be selected as the set of electric vehicles 104A-104N. In yet another embodiment, based on a subscription status of the plurality of electric vehicles 104 (for example, a status of whether each of the plurality of electric vehicles 104 is already subscribed to the server 102 for the determination of the optimal charging schedule), the set of electric vehicles 104A-104N may be determined. In another embodiment, based on the duration or time period of charging (i.e., second information), the set of electric vehicles 104A-104N may be determined. For example, the electric vehicles of the plurality of electric vehicles 104 which may charge for longer time period (say more than six hours in a day) may be determined as the set of electric vehicles 104A-104N. In another example, the plurality of electric vehicles 104 which mostly charge at the time period of higher demand where the charging cost is high, may be determined as the set of electric vehicles 104A-104N. Details of the determination of the set of electric vehicles 104A-104N are further described, for example in FIG. 4.

At 306, the charging subscription information may be transmitted. In an embodiment, the server 102 may transmit the charging subscription information (such as a subscription request for the pre-determined time period) to each of the set of electronic devices 106A-106N (such as, the first electronic device 106A, the second electronic device 106G, or the Nth electronic device 106N from the set of electronic devices 106A-106N). The transmission of the charging subscription information may indicate the benefits of the charging schedule (such as cost-saving in the electricity cost compared to the additional electricity cost incurred during the high demand of the electric power) to the set of electric vehicles 104A-104N. In an embodiment, the charging subscription information may be an alert message or a push notification that may be sent to each of the set of electronic devices 106A-106N (such as a mobile phone) associated with each of the set of electric vehicles 104A-104N. The alert message or the push notification may include information about the optimal charging schedule (and related benefits), such that the set of users 114A-114N (or the associated set of electric vehicles 104A-104N) may subscribe with the server 102 to further receive the optimal charging schedule for the pre-determined period in the future based on the provided or uploaded vehicle charging information. The set of electronic devices 106A-106N may also display the information of the charging subscription information for the set of users 114A-114N for the subscription purpose.

At 308, the acceptance information may be received. In an embodiment, the server 102 may receive the acceptance information from one or more of the set of electronic devices 106A-106N (such as, at least one of: the first electronic device 106A, the second electronic device 106B, or the Nth electronic device 106N), based on the transmitted charging subscription information. For example, the acceptance information may be an input from one or more of the set of users 114A-114N to accept the subscription or enrollment to the server 102 for the receipt of the charging schedule based on the vehicle charging information. The input may include a response to the transmitted alert message or the transmitted push notification from the server 102. For example, one or more of the set of electronic devices 106A-106N are configured to receive the input (for example, via the I/O device such as a user interface button with information such as "Yes, Go ahead with the subscription for the smart charging schedule") from the set of users 114A-114N, to accept the transmitted charging subscription information (such as the push notification or the alert message) received from the server 102. In some embodiments, the received input may indicate the acceptance of one or more terms and conditions included in the charging subscription information received from the server 102. The acceptance of the terms and conditions may indicate a consent from the users to charge their electric vehicles remotely (like based on the one or more charging control instructions transmitted from the server 102 to the electric vehicles for charging). The server 102 may further determine, based on the received acceptance information, the charging schedule for one or more of the determined set of electric vehicles 104A-104N (i.e., from which the acceptance is received) based on one or more charging criterions.

At 310, the charging schedule may be determined for one or more of the determined set of electric vehicles 104A-104N. In an embodiment, based on the one or more charging criterions (such as, but is not limited to, the location of charging, the time period of charging, a number of electric vehicles present at the location to indicate the demand of charging, the SOC, a number of electric grids or available electric power sources at the location, or combination), the server 102 may determine the charging schedule for the determined set of electric vehicles 104A-104N which may have subscribed with the server 102 or accepted the subscription of the server 102 to receive the charging schedule based on the vehicle charging information. Details of the one or more charging criterions to determine the charging schedule for the subscribed set of electric vehicles 104A-104N, is further explained, for example, in FIGS. 5A-5B. The charging schedule may relate to an optimal or smart charging schedule for the determined set of electric vehicles 104A-104N to reduce the charging cost in the future. In other words, the server 102 may determine the charging schedule for an electric vehicle based on the vehicle charging information received from the corresponding electric vehicle. The charging schedule may relate to a time period for charging the set of electric vehicles 104A-104N, when the demand of electric charge may be low or when there is a minimal electric power consumption or requirement from additional entities (such as electrical appliances at home, industries, offices, public area, and the like, or other electric vehicles). Therefore, based on the charging schedule, the set of electric vehicles 104A-104N may reduce the electric charging cost that may be incurred for charging the set of electric vehicles 104A-104N at the time of high demand.

In an embodiment, the server 102 may determine the charging schedule for one or more of the determined set of electric vehicles 104A-104N for a pre-determined time period. The pre-determined time period may be a first duration (for example, a week, a couple of weeks, or a month, and the like) that may be set as a trial period for the set of electric vehicles 104A-104N to try-out the determined charging schedule. In other words, the pre-determined time period may be the trial period to subscribe the one or more electric vehicles to experience the benefits of the charging schedule determined by the server 102. During the pre-determined time period, the server 102 may be configured to determine timing information for charging the set of electric vehicles 104A-104N based on a duration of the high demand of the electric power. For example, in case the electric power consumption from other electrical entities (say from 9:00 AM to 6:00 PM) is maximum, the server 102 may be configured to detect a high demand in the power consumption between 9:00 AM and 6:00 PM. Based on the detected high demand from the electric grid 108, the server 102 may set the charging schedule, for example, between 7:00 PM and 8:00 AM, to avoid the additional electricity cost that may be incurred for charging the set of electric vehicles 104A-104N during the high power demand (such as, during maximum electric power consumption from the electrical entities). Further, based on the detected electricity demands for a particular location (say for a city), the server 102 may distribute the charging schedules among multiple electric vehicles of the particular location, such that the electric vehicles may be charged to target state-of-charge (SOC), without putting high demand pressure on the electric grid 108. Further details of the determination of the charging schedule are provided, for example, in FIGS. 5A and 5B. In one embodiment, the server 102 may also facilitate an option to receive a scheduling request to set the charging schedule from at least one of the plurality of electric vehicles 104 or the plurality of electronic devices 106. Details of such scheduling request are described further, for example, in FIG. 6.

At 312, the one or more charging control instructions may be transmitted. In an embodiment, the server 102 may transmit one or more charging control instructions to the determined set of electric vehicles 104A-104N, based on the optimal charging schedule determined for the set of electric vehicles 104A-104N. In another embodiment, the server 102 may transmit, based on the received acceptance information, the one or more charging control instructions to one or more of the determined set of electric vehicles 104A-104N. In yet another embodiment, the server 102 may transmit the one or more charging control instructions to the one or more of the determined set of electric vehicles 104A-104N, based on the pre-determined time period of the charging schedule, that may be determined at 310. For example, in case the server 102 receives the acceptance information, the server 102 may transmit, for the pre-determined time period (for example, a week, a couple of weeks, or a month, and the like), the one or more charging control instructions to each of the subscribed set of electric vehicles 104A-104N, based on the respective charging schedule. The one or more charging control instructions may include one or more charging start or charging stop instructions or commands for the set of electric vehicles 104A-104N which may have subscribed with the server 102 to receive the smart or optimal charging schedule. For example, for the determined charging schedule (for example, between 7:00 PM and 8:00 AM), the server 102 may send the charging start instruction (i.e., for activation of charging) to the corresponding electric vehicle at 7:00 PM, and further send the charging stop instruction (i.e., for deactivation of charging) to the corresponding electric vehicle at 8:00 AM. In another example, in case the charging schedule indicates multiple time slots, then the server 102 may transmit multiple charging start and charging stop instructions to the particular electric vehicle. The one or more charging control instructions may be sent to the electronic control unit (ECU) of the electric vehicle to further control the activation or the deactivation of the electric charging with the corresponding electric charging facility device 110. In some embodiments, the server 102 may only send the charging schedule to the electric vehicle, without sending the one or more charging control instructions. In such case, the electric vehicle may generate the one or more charging control instructions (i.e., charging start/stop commands) based on the received charging schedule from the server 102.

At 314, as an alternate embodiment, the one or more charging control instructions may be transmitted to the electric charging facility device 110. In an embodiment, the server 102 may transmit the one or more charging control instructions to the electric charging facility device 110 associated with the set of electric vehicles 104A-104N, based on the determined charging schedule for the corresponding set of electric vehicles 104A-104N. In another embodiment, based on the received acceptance information, the server 102 may transmit the one or more charging control instructions to the electric charging facility device 110. In yet another embodiment, the server 102 may transmit the one or more charging control instructions to the electric charging facility device 110, based on the pre-determined time period of the charging schedule, that may be determined at 310. Based on the received one or more control instructions, the electric charging facility device 110 may control the activation or the deactivation of charging with the corresponding electric vehicle based on the determined charging schedule. In some embodiments, the server 102 may receive information (such as location, unique identifier, or communication address (such as IP address)) about the electric charging facility device 110 currently used for charging, from the particular electric vehicle or from the associated electronic device, and then transmit the one or more control instructions based on the received information about the electric charging facility device 110. In some embodiments, the server 102 is configured to store the information about the electric charging facility devices used by the user to charge their electric vehicle at different time periods (for example, charged between 10:00 AM to 4:00 PM at a first charging facility device located near work location or charged between 8:00 AM to 1:00 AM at a second charging facility device located at home location).

At 316, the summary information may be transmitted. In an embodiment, the server 102 may transmit the summary information (such as an amount of cost saved in a particular duration based on the optimal charging schedule) to the subscribed set of electronic devices 106A-106N associated with the determined set of electric vehicles 104A-104N. In some embodiments, the server 102 may transmit the summary information to the in-vehicle infotainment system of each of the set of electric vehicles 104A-104N. The particular duration may be in last certain days, weeks or in months. In some embodiments, the server 102 may receive a request from the electronic device (such as the first electronic device 106A) to send the summary information about the charging of the corresponding electric vehicle based on the subscribed charging schedule. For example, the server 102 may be configured to transmit, based on the execution of the charging schedule, the summary information to the set of electronic devices 106A-106N associated with the determined set of electric vehicles 104A-104N. The summary information may indicate, for example, at least one of: the amount of cost saved, an amount of reduction of carbon dioxide in an environment, a number of charging sessions happened based on the optimal charging schedule, or a total amount of electric charging (for example in Watts or Kilo-Watts) performed based on the charging schedule for the corresponding electric vehicle.

In an embodiment, the server 102 may determine the amount of cost saved based on a difference between a charging cost during the optimal charging schedule and a charging cost when the electric vehicle was not charged using the optimal charging schedule. The amount of cost saved may be included in the summary information in form monetary values (for example 10 dollars cost saving per day) or in form percentages (for example 20% cost saved last month). Further, the server 102 may determine the amount of reduction of carbon dioxide in the environment based on a comparison of a total distance travelled by the electric vehicle charged using the optimal charging schedule, with a total distance travelled by the electric vehicle charged without using the charging schedule (or comparison with distance travelled using any fossil-fuel like petrol or diesel). In an example, the first user 114A may charge the corresponding electric vehicle more based on the optimal charging schedule determined by the server 102, and thus the amount of the distance travelled using the electric charge and the amount of carbon dioxide saved may be more.

Further, the server 102 may include a counter (not shown) that may determine the number of charging sessions of each of the set of electric vehicles 104A-104N, to determine whether the number of charging sessions (after being subscribed with the server 102 for the optimal charging schedule) has been increased or not. Further, server 102 may also determine the amount of charging at each charging session of each of the subscribed set of electric vehicles 104A-104N, and at a completion of the pre-determined period of the charging schedule, the server 102 may determine the total amount of electric charging performed based on the amount of charging done at each charging session of each of the set of electric vehicles 104A-104N.

In another embodiment, the summary information may also indicate a recommendation to change, for example, at least one of: charging preference, the location of charging, or a faulty charging component associated with each of the determined set of electric vehicles 104A-104N. For example, in case the server 102 determines the optimal charging schedule for a second half of the day (for example, from 1:00 PM to 3:00 PM) for a particular electric vehicle, and the electric vehicle is charging only during a first half of the day (for example, from 9:00 AM to 12:00 PM), the server 102 may transmit the summary information to the electronic device associated with the user of the electric vehicle to indicate that if the electric vehicle will change its charging preference from the first half of the day to the second half of the day, it may improve the amount of cost saved. In another example, in case the set of electric vehicles 104A-104N are charged at a first location, and the server 102 determines a second location for charging, which may have lesser cost of the electricity per unit in comparison to a cost of electricity per unit in the first location, then the server 102 may transmit the summary information to the set of electronic devices 106A-106N to recommend that if each of the set of electric vehicles 104A-104N changes their location of charging from the first location to the second location, it may improve the amount of cost saved. In yet another example, the server 102 may continuously monitor charging components associated with each of the determined set of electric vehicles 104A-104N during charging based on the optimal charging schedule. In case of any abnormality in the charging components associated with each of the determined set of electric vehicles 104A-104N, the server 102 may transmit the summary information to the corresponding set of electronic devices 106A-106N associated with the set of electric vehicles 104A-104N. Such summary information may indicate the faulty charging component associated with the set of electric vehicles 104A-104N, and recommend steps or solutions to troubleshoot or repair such faulty charging component to timely improve the charging process, which may subsequently improve the amount of cost saved, based on the charging schedule.

In some embodiments, the summary information may include recommendations about the location of the electric charging facility device to charge the electric vehicle. The recommendation about the location of the electric charging facility device may be based on locations of work place and/or residential place of the user associated the electric vehicle. For example, the recommended location may be closest to the location of the work place and/or residential places of the user. In some embodiments, the summary information provided to a particular electric vehicle may include a scorecard indicating earned points based on usage of the optimal charging schedule. The server 102 may generate the score card for each of the subscribed set of electric vehicles 104A-104N based on respective utilization of the charging schedule. Such summary information may be beneficial for each of the set of users 114A-114N associated with each of the set of electronic devices 106A-106N to understand a profit or benefits associated with the optimal charging schedule determined by the server 102 for the subscribed set of electric vehicles 104A-104N. Based on such benefits, the set of users 114A-114N may extend the subscription to the server 102 to provide the optimal charging schedule or convert the trial-based subscription (i.e., free subscription) to a regular subscription (i.e., paid subscription) which may further increase a revenue or profit margin for an organization associated with the server 102.

Figure 4:
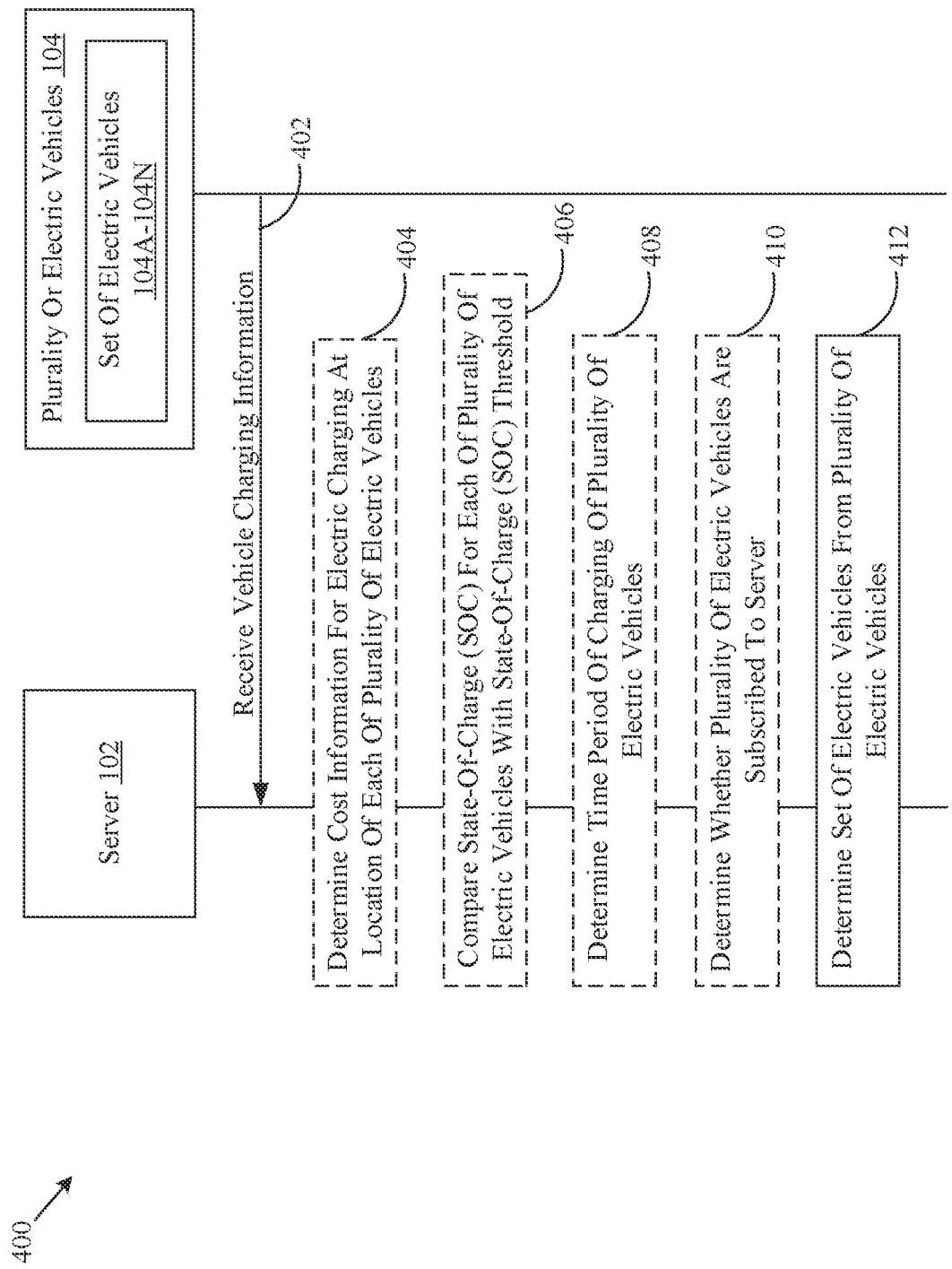
FIG. 4 is a sequence diagram that illustrates exemplary operations for determining a set of vehicles to schedule electric charging by the server of FIG. 1, in accordance with an embodiment of the disclosure.

FIG. 4 is a sequence diagram that illustrates exemplary operations for determining a set of vehicles to schedule the electric charging for vehicles by the server of FIG. 1, in accordance with an embodiment of the disclosure. FIG. 4 is explained in conjunction with elements from FIGS. 1, 2, and 3. With reference to FIG. 4, there is shown a sequence diagram 400 of exemplary operations handled by the server 102 or the circuitry 202 for determination of the set of electric vehicles 104A-104N from the plurality of electric vehicles 104 as described, for example, at 304 in FIG. 3. In FIG. 4, the server 102 or the circuitry 202 performs the exemplary operations from 402 to 412, which relates to the determination of the set of electric vehicles 104A-104N.

At 402, the vehicle charging information may be received. In an embodiment, the server 102 may be configured to receive the vehicle charging information from the plurality of electric vehicles 104. For example, the vehicle charging information may be received from the in-vehicle infotainment system or from the electronic control unit (ECU) of each of the plurality of electric vehicles 104. In another embodiment, the vehicle charging information related to the plurality of electric vehicles 104 may be received from the plurality of electronic devices 106 associated with the plurality of electric vehicles 104. The vehicle charging information may be stored in the memory 204 of the server 102. The vehicle charging information may include at least one of the first information related to the location of charging of a particular electric vehicle, the second information related to the time period of charging, or the third information related to the state-of-charge. The vehicle charging information described at 402 of FIG. 4 is same as the vehicle charging information described, for example, at 302 of FIG. 3. Therefore, the description of the vehicle charging information is omitted from the disclosure of FIG. 4 for the sake of brevity.

At 404, cost information for electric charging at the location of each of the plurality of electric vehicles 104 may be determined to determine the set of electric vehicles 104A-104N. The server 102 or the circuitry 202 may determine the cost information (i.e., electricity cost) for electric charging at the location of each of the plurality of electric vehicles 104. The server 102 may determine the locations of electric charging of each of the plurality of electric vehicles 104 from the first information included in the vehicle charging information received from each of the plurality of electric vehicles 104. For example, the first information may include all the geo-locations at which the electric vehicle got electrically charged in a particular duration (say in last one month). The included location may be geo-location of the electric charging facility device 110 by which the particular electric vehicle may be charged.

The server 102 may further determine the set of electric vehicles 104A-104N from the plurality of electric vehicles 104, based on the determined cost information. For example, in a particular location if the cost of charging is significantly higher over a predefined cost threshold at different time periods (i.e., day, evening, or night time periods), then the server 102 may select the set of electric vehicles 104A-104N which are normally charged at the same location, so that the server 102 may determine the optimal or smart charging schedule for such electric vehicles to save the cost of charging in the future during the subscription period with the server 102. In such case, the server 102 may recommend different locations in the determined charging schedule where the cost of charging may be lower than the predefined cost threshold.

In another example, in case the server 102 communicates with the electric grid 108 of a first location mentioned in the first information and receives a discount in the electricity cost from the electric grid 108 based on a low electricity demand at the same first location, the server 102 may determine the set of electric vehicles 104A-104N of the same first location, such that the determined electric vehicles may get the benefits (such as cost-saving in the charging cost) when charged at the same first location mentioned in the optimal charging schedule determined for the set of electric vehicles 104A-104N. In another example, in case the server 102 communicates with the electric grid 108 of a second location mentioned in the first information of the vehicle charging information, and receives no discount in the electricity cost based on the high electricity demand, the server 102 may not determine the set of electric vehicles 104A-104N in the second location, as it may be difficult to provide the cost benefits based on the determined charging schedule for such set of electric vehicles 104A-104N located in the second location.

At 406, the state-of-charge (SOC) for each of the plurality of electric vehicles may be compared with a state-of-charge (SOC) threshold to determine the set of electric vehicles 104A-104N from the plurality of electric vehicles 104. The server 102 may compare the third information related to the state-of-charge (SOC) for each of the plurality of electric vehicles 104 with the state-of-charge (SOC) threshold that may be stored in the memory 204. The third information may be included in the vehicle charging information received from each of the plurality of electric vehicles 104 (say at 402 in FIG. 4). The third information related to the state-of-charge (SOC) may relate a current SOC available in the respective battery of each the plurality of electric vehicles 104 at a time of charging the corresponding electric vehicle. For example, the current SOC may relate to the battery SOC before charging the electric vehicle or at the start of the electric charging.

In an example, in case the current state-of-charge (SOC) of the electric vehicle at the start of charging is at, say 80% (i.e., which may be the SOC threshold set by the server 102), then the electric vehicle may require only a lesser time period (for example, 2 hours based on a charging speed of the electric vehicle) to charge the electric vehicle from 80% to 100%. In such a case, it may be difficult for the server 102 to determine the optimal charging schedule for such lower time period of charging of the electric vehicle, and hence such vehicle from the plurality of electric vehicles 104 may be given less priority and may not be determined as the set of electric vehicles 104A-104N. In an embodiment, the server 102 may determine the SOC threshold lower than the current SOC, for example, in case the current SOC of the electric vehicle is higher than the SOC threshold (say 70%), then the electric vehicle may not be selected in the set of electric vehicles 104A-104N. This indicates that such electric vehicle generally maintains their current SOC at higher value due to lower utilization of the electric vehicle or due to frequent charging for short durations. Thus, the server 102 may not encourage such electric vehicles to be subscribed with the server 102 to receive the optimal charging schedules.

In another example, in case the current state-of-charge (SOC) of the electric vehicle (in the plurality of electric vehicles 104) at the start of charging is at, say 20% battery (i.e., that may be lower than the SOC threshold, say 70%), then the electric vehicle may require a higher time period (for example, 6 hours based on a charging speed of the electric vehicle) to charge the electric vehicle from 20% battery to 100% battery. In such a case, because of the higher time period of charging, it may be easier for the server 102 to determine the optimal charging schedules for such higher time period of charging, and hence such vehicle from the plurality of electric vehicles 104 may be given more priority and may be determined as the set of electric vehicles 104A-104N. The server 102 may determine multiple charging schedules based on the charging costs, for such electric vehicle which may require higher duration to get fully charged. For example, for the required duration of six hours to get fully charged, the server 102 may determine the charging schedule as 3 hours in the early morning (say 5:00 AM to 8:00 AM) and 3 hours late night (say 11:00 PM to 2:00 AM) based on the lower charging cost at such timezones. In an embodiment, if the difference between the SOC at start of charging and the SOC at end of charging is higher than the SOC threshold, then the corresponding electric vehicle may be selected in the set of electric vehicles 104A-104N as being potential for the subscription with the server 102 for the determination of the optimal charging schedule. For example, in case the electric vehicle normally gets charged for 75% of battery (i.e., difference between start SOC and end SOC) which is higher than the SOC threshold (say 50% of charging), then the corresponding electric vehicle may be selected in the set of electric vehicles 104A-104N.

In yet another example, the server 102 may compare the current the state-of-charge (SOC) (i.e., mentioned in the third information) for the electric vehicle of the plurality of electric vehicles 104 with the SOC threshold. The server 102 may further determine the set of electric vehicles 104A-104N from the plurality of electric vehicles 104, based on the comparison. In case the SOC threshold is set at 20% battery (i.e., lower SOC value), and the current SOC is below the SOC threshold, for example at 15% battery, the server 102 may select such electric vehicle from the plurality of electric vehicles 104 in the set of electric vehicles 104A-104N for further determination of the optimal charging schedule for the set of electric vehicles 104A-104N. In an embodiment, the server 102 may set different SOC thresholds for different locations of the plurality of electric vehicles 104 or may set different SOC thresholds for different types of electric vehicles.

At 408, the time period of charging for each of the plurality of electric vehicles 104 may be determined. The server 102 or the circuitry 202 may be configured to determine the time period of charging indicated by the second information in the vehicle charging information that may be received from each of the plurality of electric vehicles 104. The server 102 may determine the time period of charging to further determine the set of electric vehicles 104A-104N from the plurality of electric vehicles 104. The second information related to the time period of charging may indicate a duration or time period of charging the electric vehicle that may be measured by at least one of the electric vehicle, the associated electronic device, or the electric charging facility device 110. In case the electric vehicle is normally charged for a higher time period (for example 5-10 hours on daily basis i.e., above a time period threshold set by the server 102), then the server 102 may select the electric vehicle in the set of electric vehicles 104A-104N for the determination of the optimal charging schedule. In another example, in case the electric vehicle is generally charged at the time period (say during the peak hours of utilization of electricity) at a particular location, then the server 102 may select the electric vehicle in the set of electric vehicles 104A-104N because such electric vehicle may like to subscribe to the server 102 to receive the optimal charging schedule and earn related cost saving benefits.

In another example, in case the electric vehicle is normally charged at the time period (say very late at night where the electricity demand and charging cost is low), then the server 102 may not select such electric vehicle in the set of electric vehicles 104A-104N from the plurality of electric vehicles 104. In another example, in case the charging pattern related to the time period indicates that the electric vehicle charges for smaller duration in a day (say for only 30 mins in a day), such electric vehicle may not be selected in the set of electric vehicles 104A-104N. In another example, in case the charging pattern related to the time period indicates that the electric vehicle charges for smaller duration at regular interval (i.e., say for 30 mins after every 2 hours during the day time), such electric vehicle may be selected by the server 102, because an optimal charging schedule may be provided to such electric vehicle, for example the optimal charging schedule recommends to combine certain time periods for charging when the charging cost is comparatively lower, rather than charging the electric vehicle at the regular intervals.

At 410, it may be determined whether the plurality of electric vehicles 104 are subscribed to the server 102, to determine the set of electric vehicles 104A-104N. The server 102 or the circuitry 202 may determine whether the plurality of electric vehicles 104 are subscribed to the server or not, based on the corresponding vehicle identification information (such as vehicle identification number) associated with the plurality of electric vehicles 104. The vehicle identification information may be included in the vehicle charging information received from the plurality of electric vehicles 104 or from the plurality of electronic devices 106. The server 102 may further select the set of electric vehicles 104A-104N from the plurality of electric vehicles 104, based on the determination. The server 102 may verify a subscription status for the plurality of electric vehicles 104 based on the received vehicle identification information. Information about the subscription status for each of the plurality of electric vehicles 104 may be stored in the memory 204. For example, in case some of the plurality of electric vehicles 104 are already subscribed to the server 102 and using the benefits (such as cost-saving in the electricity cost for charging) of the optimal charging schedule, the server 102 may detect such vehicles from the plurality of electric vehicles 104, based on the corresponding vehicle identification information and may not select in the set of electric vehicles 104A-104N for further determination of the optimal charging schedule. In another embodiment, based on the determination with respect to the vehicle identification information, the server 102 may select the electric vehicles that are not already subscribed to the server 102, in the set of electric vehicles 104A-104N.

At 412, the set of electric vehicles 104A-104N may be determined or selected from the plurality of electric vehicles 104 based on the at least one of the steps mentioned at 404, 406, 408, or 410 in FIG. 4. Based on the received vehicle charging information, the server 102 may determine the set of electric vehicles 104A-104N for the charging schedule based on at least one of the first information, the second information, third information, and the vehicle identification information. In an embodiment, based on the location of charging (as described at 404), the set of electric vehicles 104A-104N may be determined based on the first information indicating the location of charging. In another embodiment, based on the state-of-charge (as described at 406), the set of electric vehicles 104A-104N may be determined based on the third information indicating the SOC of the electric vehicle. In another embodiment, based on the time period of charging (as described at 408), the set of electric vehicles 104A-104N may be determined based on the second information about the time period of charging. In yet another embodiment, based on the subscription status (as described at 410) of the plurality of electric vehicles 104, the set of electric vehicles 104A-104N may be determined based on the vehicle identification information. In some embodiments, the server 102 may determine the set of electric vehicles 104A-104N based on the combination of the first information, the second information, third information, and the vehicle identification information included in the vehicle charging information received from each of the plurality of electric vehicles 104 or the plurality of electronic devices 106. Upon the determination of the set of electric vehicles 104A-104N, the server 102 may further determine the optimal or smart charging schedule for the determined set of electric vehicles 104A-104N based on the one or more charging criterions. Details of such one or more charging criterions are further described, for example, in FIGS. 5A-5B.

Figure 5A:
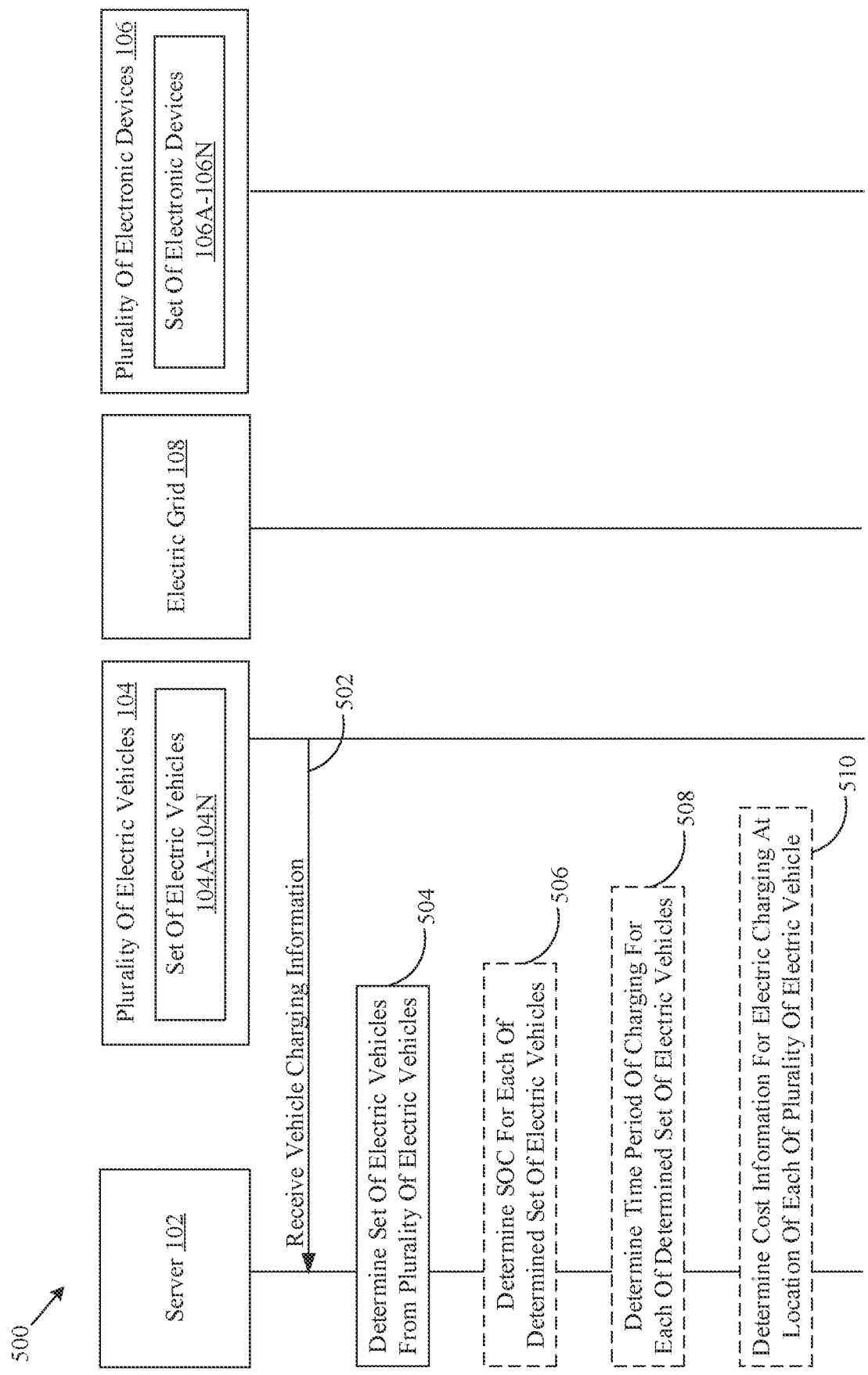
FIGS. 5A-5B collectively depict a sequence diagram that illustrates exemplary operations for determining a charging schedule for vehicles by the server of FIG. 1, in accordance with an embodiment of the disclosure.
Figure 5B:
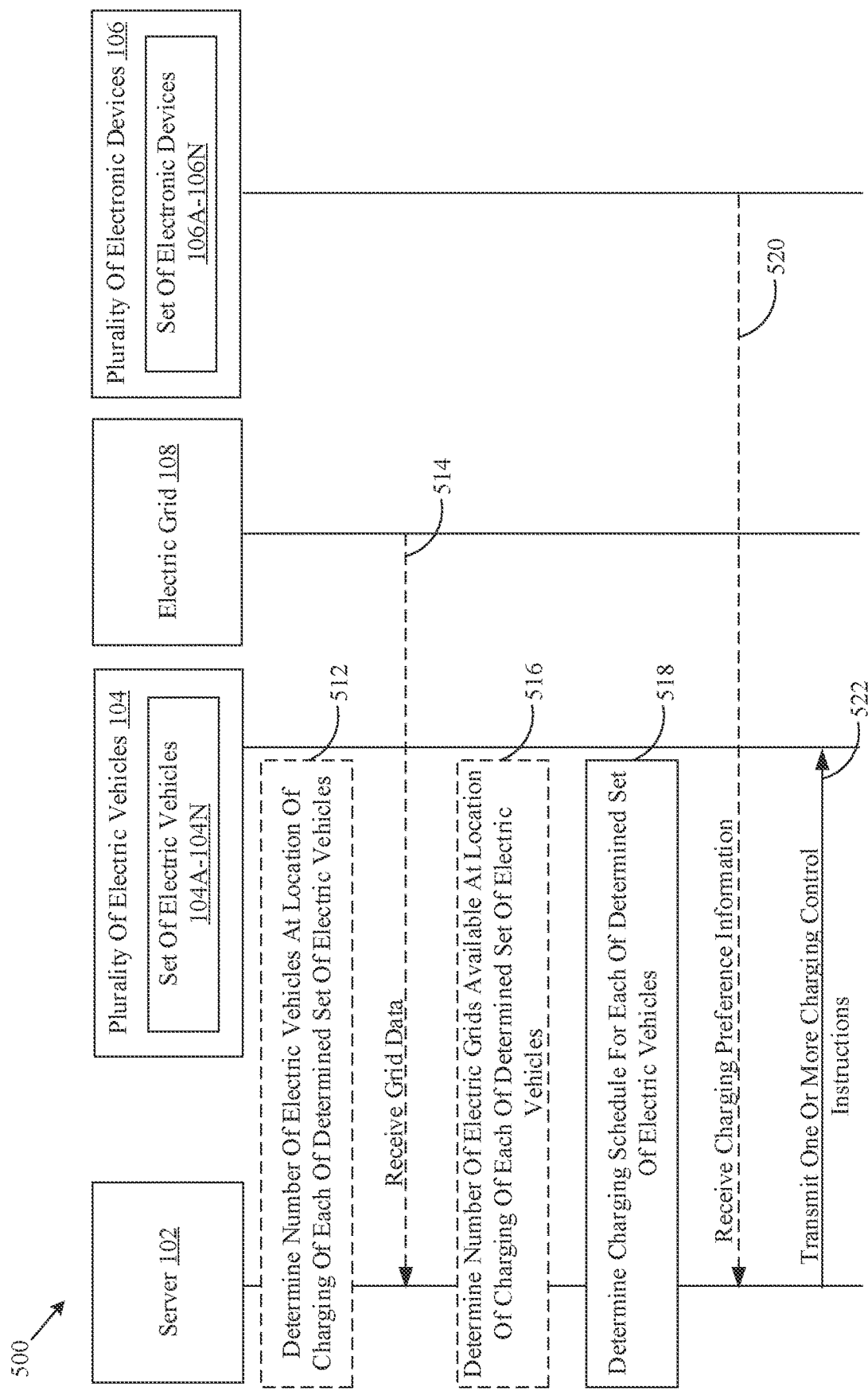

FIGS. 5A-5B collectively depict a sequence diagram that illustrates exemplary operations for determination of a charging schedule for vehicles by the server of FIG. 1, in accordance with an embodiment of the disclosure. FIG. 5 is explained in conjunction with elements from FIGS. 1, 2, 3, and 4. With reference to FIGS. 5A-5B, there is shown a sequence diagram 500 of exemplary operations handled by the server 102 or the circuitry 202 for determination of the optimal charging schedule for the set of electric vehicles 104A-104N. In FIG. 5, the server 102 or the circuitry 202 performs the exemplary operations from 502 to 522, which relates to determination of the charging schedule for the determined set of electric vehicles 104A-104N.

At 502, vehicle charging information may be received. In an embodiment, the server 102 may be configured to receive the vehicle charging information from the plurality of electric vehicles 104. The vehicle charging information may be stored in the memory 204 of the server 102. The vehicle charging information may include at least one of the first information related to the location of charging, the second information related to the time period of charging, or the third information related to the state-of-charge. The vehicle charging information described at 502 of FIG. 5 is same as the vehicle charging information described, for example, at 302 of FIG. 3. Therefore, the description of the vehicle charging information is omitted from the disclosure of FIG. 5 for the sake of brevity.

At 504, the set of electric vehicles 104A-104N may be determined from the plurality of electric vehicles 104. Based on at least one of the location of charging (as described at 404), the state-of-charge (as described at 406), the time period of charging (as described at 408) or the subscription status (as described at 410), the server 102 may determine the set of electric vehicles 104A-104N from the plurality of electric vehicles 104. Details of the determination of the set of electric vehicles 104A-104N are described, for example, in FIG. 4.

At 506, the state-of-charge (SOC) may be determined for each of the determined set of electric vehicles to determine the charging schedule. In an embodiment, the server 102 may be configured to determine, from the received vehicle charging information, the third information related to the state-of-charge (SOC), for each of the determined set of electric vehicles 104A-104N. In an embodiment, the one or more charging criterions to determine the charging schedule may be based on the third information related to the state-of-charge (SOC) for each of the determined set of electric vehicles 104A-104N. The server 102 may be further configured to determine the optimal charging schedule for each of the determined set of electric vehicles 104A-104N based on the third information. In some embodiments, the server 102 may determine the optimal charging schedule for one or more of the set of electric vehicles 104A-104N which may subscribe to the server 102 or provide acceptance to the transmitted charging subscription information (i.e., described at 308 in FIG. 3).

In an example, in case the state-of-charge (SOC) of a particular electric vehicle of the set of electric vehicles 104A-104N at the start of charging is at, say 80%, then the electric vehicle may require a minimal time period (for example, 2 hours based on the charging speed of an in-built battery) to charge the electric vehicle from 80% to 100%. In such a case, the server 102 may determine a single charging schedule for the requirement of the minimal time period of charging. The server 102 may select the single charging schedule (for example of 2 hours), based on the electricity cost that may be received from the electric grid 108 (i.e., located at the location of the electric vehicle) for a particular day. For example, the server 102 may select the charging schedule for 2 hours duration based on minimal cost received from the electric grid 108 among different time slots in the particular day. For example, among multiple time slots of 2 hours duration, an evening slot between 5:00 PM to 7:00 PM provides least value of charging cost, then the server 102 may determine the charging schedule between 5:00 PM to 7:00 PM to charge the electric vehicle for 2 hours to take the current SOC from 80% to 100% of the electric vehicle. In some embodiments, based on the received vehicle charging information, the server 102 may determine the preferred time period (i.e., second information) of charging of a particular electric vehicle, and accordingly determine the optimal charging schedule based on the current SOC, the charging cost received from the electric grid 108 for different time slots, and preferred time period to charge the electric vehicle. For example, in case the preferred time period of charging is night time (say between 10:00 PM to 12:00 AM), and the charging cost received from the electric grid 108 for both two hours slots (5:00 PM to 7:00 PM and 10:00 PM to 12:00 AM) is same, then the server 102 may determine the optimal charging schedule as 10:00 PM to 12:00 AM for the electric vehicle.

In another example, in case the state-of-charge (SOC) of the electric vehicle at the start of charging is at, say 20%, then the corresponding electric vehicle may require a higher time period (for example, 6 hours based on the charging speed of the in-built battery) to charge the electric vehicle from 20% to 100%. In such a case, based on the higher time period (say 6 hours), the server 102 may determine the optimal charging schedule with a plurality of charging slots, based on the electricity cost that may be received from the electric grid 108 for such higher time period of charging, for each of the determined set of electric vehicles 104A-104N. The server 102 may not provide a single charging schedule for the higher time period as it would be difficult to get a consistent lower charging cost for complete duration due to variations in loads/demand of electricity and corresponding charging cost in between. In an embodiment, the server 102 may determine the charging schedule having the plurality of charging slots that may be arranged at specific intervals. Based on the received electricity cost from the electric grid 108 for different time slots (i.e., for example time slots of one hour each), the server 102 may identify the plurality of time slots having lower charging cost in comparison to other slots, where total time period of the plurality of slots may be same as the total charging time required to charge the electric vehicle from 20% SOC to 100% SOC. For example, the server 102 may determine the optimal charging schedule as 7:00 AM to 9:00 AM, 6:00 PM to 8:00 PM, and 12:00 AM to 2:00 AM to completely charge the electric vehicle for 6 hours of the required time period. In certain situations, specific intervals may be scheduled between the plurality of time slot for convective cooling of the battery of the each of the set of electric vehicles 104A-104N. Such specific intervals may improve the life of the battery of the each of the set of electric vehicles 104A-104N. In some embodiments, based on the received electricity cost, the server 102 may determine the single charging schedule to charge the electric vehicle for a higher time period (say more than 4 hours).

In yet another example, the server 102 may compare the current state-of-charge (SOC) for each of the subscribed set of electric vehicles 104A-104N with a charging threshold. The server 102 may further determine the charging schedule for the set of electric vehicles 104A-104N, based on the comparison. In case the charging threshold is set at 80% SOC, the server 102 may compare the current state-of-charge (SOC) for each of the subscribed set of electric vehicles 104A-104N with the charging threshold (such as 80% SOC). Further, in case the current state-of-charge (SOC) is below the charging threshold, for example at 15% current SOC, the server 102 may determine the optimal charging schedule to charge the corresponding electric vehicle from the current SOC to the charging threshold (such as the 80% SOC), based on the electricity cost that may be received from the electric grid 108 associated with the location of the corresponding electric vehicle.

At 508, the time period of charging may be determined for each of the determined set of electric vehicles 104A-104N to determine the charging schedule. In an embodiment, the server 102 may determine the time period of charging from the received vehicle charging information including the second information about the time period of charging. In an embodiment, the one or more charging criterions to determine the charging schedule may be based on the second information related to the time period of charging for each of the subscribed set of electric vehicles 104A-104N. The server 102 may further configured to determine the optimal charging schedule for each of the determined set of electric vehicles 104A-104N based on the second information. The time period of charging (i.e., included in the second information) may indicate a current timing pattern followed by a particular electric vehicle in recent past, for the determination of the optimal charging schedule by the server 102.

In an example, the server 102 may determine the timing pattern of charging based on the second information for each of the set of electric vehicles 104A-104N. The timing pattern may be determined based on a plurality of time period samples mentioned in the second information for each of the set of electric vehicles 104A-104N. For example, the timing pattern may indicate that the electric vehicle generally gets charged in the morning time on daily basis for 4 hours (say between 6:00 AM to 10:00 AM). In another example, the timing pattern may indicate that the electric vehicle generally gets charged during the night time thrice in a week for complete eight hours (say between 11:00 PM to 7:00 AM). In another example, the timing pattern may indicate that the electric vehicle gets charged at regular intervals, such as charged for one hour after every 4 hours of intervals. The server 102 may be configured to determine the optimal charging schedule for the particular electric vehicle based on the determined timing pattern. For example, in case the timing pattern indicate that the electric vehicle gets charged for 6 hours of the time period (i.e., 5:00 PM to 11:00 PM), then the server 102 may determine the optimal charging schedule at least within the time period, based on the electricity cost that may be received from the electric grid 108 (or related authorities) for such time period of charging for the electric vehicle. For example, based on the determined time period of charging between 5:00 PM to 11:00 PM (i.e., 6 hours) and based on the received electricity costs, the server 102 may determine that the charging cost between 8:00 PM to 10:00 PM is significantly higher due to high electricity demand. The server 102 may accordingly calculate the optimal charging schedule to charge the electric vehicle for first three hours between 5:00 PM to 8:00 PM and rest of three hours from 10:00 PM to 1:00 AM to save the cost of charging by following the optimal charging schedule. In another example, in case the timing pattern indicates that the electric vehicle gets charged at regular intervals, such as charged for one hour after every 4 hours of intervals, the server 102 may coordinate with the electric grid 108 (or related authorities located at the location of the electric vehicle) to determine the electricity cost and demands for a complete day. In case of high demand in between, the server 102 may recommend the optimal charging schedule to the electric vehicle, such as to charge the electric vehicle for 2 hours after every 6 hours intervals to save the charge cost or avoid charging between the peak hours of demand (say avoid charging between 8:00 AM to 11:00 AM and between 7:00 PM to 10:00 PM).

In some embodiments, the server 102 may determine the optimal charging schedule in such a way that it is scheduled within the time period of charging (i.e., indicated by the second information) for each of the subscribed set of electric vehicles 104A-104N. Such scheduling of the electric charging within the time period, may be advantageous, because, each of the set of users 114A-114N associated with each of the determined set of electric vehicles 104A-104N, may not be required to plug-out their electric vehicles from the respective electric charging facility device 110 specifically when the charging schedule is different from the preferred time period of the particular electric vehicle. In such case, the set of electric vehicles 104A-104N may be charged within the preferred time period and the server 102 may further transmit the one or more control instructions to the corresponding electric vehicle based on the determined charging schedule. The details of the control instructions are provided, for example, at 312.

In another example, in case the time period indicates the charging of the electric vehicle for a short duration in a day (for example 2 hours), the server 102 may determine the single charging schedule (as described at 506), based on the electricity cost that may be received from the electric grid 108, for the electric vehicle. In yet another example, in case the time period indicates the charging of the electric vehicle for a longer duration in a day (for example, 6 hours), the server 102 may determine the charging schedule with the plurality of charging slots (as described at 506), based on the electricity costs received from the electric grid 108 for the electric vehicle.

At 510, cost information for electric charging at the location of charging may be determined for each of the determined set of electric vehicles 104A-104N. In an embodiment, the server 102 may determine the cost information (such as the electricity cost) at the location of charging for each of the determined set of electric vehicles 104A-104N. The location of charging for the particular electric vehicle may be indicated in the first information included in the received vehicle charging information (as described, for example, at 302 in FIG. 3 and at 404 in FIG. 4). In an embodiment, the one or more charging criterions may indicate the cost information at the location of charging of each of the determined set of electric vehicles 104A-104N. The server 102 may be configured to determine the optimal charging schedule for each of the determined or subscribed set of electric vehicles 104A-104N based on the determined cost information.

In an embodiment, the server 102 may determine the cost information at the location of charging (i.e., first information) for a particular electric vehicle based on the communication with the electric grid 108 (or with related authorities) located at the same location (for example of same city, town, or ZIP code). The server 102 may further determine the optimal charging schedule, based on the determined cost information for the particular location. For example, in the electric vehicle is located at California state, the server 102 may determine the time period slots in the California state at which the electricity costs are lower than other time period slots for a day, and further include such time period slots with lower charging cost in the optimal charging schedule determined for the electric vehicle.

In another example, in case the server 102 communicates with the electric grid 108 at the location of the electric vehicle, and receives a discount in the electricity cost for a particular time slot in a day (say between 2:00 PM to 4:00 PM), the server 102 may determine the charging schedule based on the inclusion of such time slot to further provide the benefits (such as cost-saving in the electric charging) to the electric vehicle. In another example, if the server 102 does not receive any discount in the electricity cost from the electric grid 108 (i.e., located at the location of the electric vehicle) fora particular time slot, the server 102 may not include such time slot in the determine charging schedule for the electric vehicle.

In an embodiment, the server 102 may determine the cost information at the location of each of the subscribed set of electric vehicles 104A-104N based on the electric power consumption of the additional entities (such as electrical appliance at homes, industries, offices, public area, and other electric vehicles) at the same location. For instance, in case the additional entities at the location of each of the determined set of electric vehicles 104A-104N are having the high electricity demands (such as a high electric power consumption) at a particular time period (say from 9:00 AM to 6:00 PM), the server 102 may be configured to receive higher electricity cost (i.e., cost information) from the electric grid 108 for the same time period. To avoid such additional electricity cost during such high electricity demand, the server 102 may determine the charging schedule for another time slot (say between 7:00 PM and 8:00 AM. The server 102 may determine the charging schedule in such a way that the cost information for charging the subscribed set of electric vehicles 104A-104N may include a nominal cost without the additional electricity cost.

At 512, a number of electric vehicles at the location of charging may be determined for each of the determined set of electric vehicles 104A-104N, to determine the charging schedule. In an embodiment, the server 102 may determine the number of electric vehicles at the location of charging for each of the determined set of electric vehicles 104A-104N, to determine the charging schedule. The location of charging for each of the determined (or subscribed) set of electric vehicles 104A-104N may be mentioned in the first information included in the vehicle charging information. In an embodiment, the one or more charging criterions may indicate the number of electric vehicles at the location of charging of each of the determined set of electric vehicles 104A-104N. The server 102 may further configured to determine the optimal charging schedule for each of the determined set of electric vehicles 104A-104N based on the number of electric vehicles.

In an embodiment, based on the first information about the location of charging of a particular electric vehicle, the server 102 may determine the number of other electric vehicles present in the same location. For example, if the location of charging of the electric vehicle is a particular city, then the server 102 may determine the number of electric vehicles present in the same city to predict an electricity demand in the city based on the presence of the number of other electric vehicles. The server 102 may determine the number of electric vehicles present in a particular location based on subscription of the electric vehicles with the server 102. In some embodiments, the server 102 may communicate with a particular transport authority (not shown) of a particular location to determine the number of electric vehicles present in the particular location. Based on the determined number of electric vehicles and predicted electricity demand, the server 102 may determine the optimal charging schedule. For example, if the electric vehicle generally charges at a particular time period (say between 8:00 AM to 10:00 AM) and at the same time period the number of electric vehicles present in the same location is substantially high (i.e., higher than a vehicle threshold), then the server 102 may not include that time period in the optimal charging schedule due to high electricity demand and cost at the same time period, based on higher number of electric vehicles. In another example, in case the server 102 determines that the number of electric vehicles may be less in a particular time period (i.e., determined due to tracking of in-out movement of electric vehicles from a particular location), then the server 102 may include such time period in the optimal charging schedule because of lesser electricity demand and cost in such time period with lesser number of the electric vehicles.

At 514, grid data may be received. In an embodiment, the server 102 may receive the grid data from a centralized electricity authority (not shown). For example, the grid data may indicate information about a number of electric grids available (i.e., for power transmission) at the location of charging (i.e., first information) of each of the set of electric vehicles 104A-104N. In some embodiments, the information about the number of electric grids may be received from one electric grid (such as electric grid 108 shown in FIG. 5B). In an embodiment, the grid data may further include information associated with the electricity cost that may be incurred for the power transmission from different electric grids and/or information associated with the additional electricity cost that may be incurred for the power transmission during the high electricity demand. Based on the received grid data, the optimal charging schedule may be determined for each of the subscribed set of electric vehicles 104A-104N.

At 516, the number of electric grids available at the location of charging (i.e., first information) may be determined for each of the determined set of electric vehicles 104A-104N, to determine the charging schedule. In one embodiment, the server 102 may be configured to determine, based on the received grid data, the number of electric grids available at the location of charging for each of the determined set of electric vehicles 104A-104N, to determine the optimal charging schedule. In an embodiment, the one or more charging criterions to determine the charging schedule may indicate the number of electric grids available at the location of charging of each of the determined set of electric vehicles 104A-104N. The server 102 may further configured to determine the optimal charging schedule for each of the determined (or subscribed) set of electric vehicles 104A-104N based on the number of electric grids indicated by the received grid data.

For example, the server 102 may determine a first number of electric grids at a first location, based on the received grid data for a particular electric vehicle being charged at the first location in past. The server 102 may further determine a second number of electric grids at a second location, based on the received grid data for a particular electric vehicle being charged at the second location in past. The first number of electric grids may be more in number as compared to the second number of electric grids. In such a case, as there is an increased supply of electric power in the first location due to higher number of electric grids available to supply the electric power, there may be higher grid discount in the electricity cost at the first location. Further, as there is a reduced supply of electric power in the second location due to lesser number of electric grids available in the second location, there may be a minimal grid discount or no grid discount in the electricity cost for the electric vehicles in the second location. The server 102 may further determine, based on the number of the electric grids and corresponding grid discount, the charging schedule for each of the set of electric vehicles 104A-104N charged at different locations. For example, based on the large number of electric grids available to supply more electric power at particular location, the server 102 may determine that a particular time period (say peak hour of electricity demand) still may provide electricity discount and may be considered in the optimal charging schedule, in comparison to other locations where less number of electric grids are available to power the electric vehicles via the corresponding electric charging facility device 110.

At 518, the charging schedule for each of the determined set of electric vehicles 104A-104N may be determined based on the one or more charging criterions. In some embodiments, the charging schedule for each of the subscribed set of electric vehicles 104A-104N (i.e., subscribed based on steps 306-308 in FIG. 3) may be determined based on the one or more charging criterions. In an embodiment, the server 102 may determine the optimal charging schedule for each of the set of electric vehicles 104A-104N based on the one or more charging criterions as described, for example, at 506, 508, 510, 512, and 516 in FIGS. 5A-5B. In some embodiments, in addition to the mentioned charging criterions, the server 102 may determine the optimal charging schedule based on information about the user of the electric vehicle. The information about the user may include, but is not limited to, time schedules related to work, travel, and home. For example, the determined charging schedule may not include any time schedule which is same as the travel schedule of the user using the electric vehicle. Therefore, based on the optimal charging schedule, the set of electric vehicles 104A-104N may reduce the additional electricity cost that may be incurred for charging the corresponding electric vehicles due to irregular and high electricity demands. Based on the aforementioned charging criterions, the server 102 may distribute the charging schedules (say in a day) among the subscribed set of electric vehicles 104A-104N, to balance the load of the electricity demands on the electric grid 108.

At 520, the charging preference information may be received. In an embodiment, the server 102 may be configured to receive the charging preference information from the electronic device (such as the first electronic device 106A, the second electronic device 106B, or the Nth electronic device 106N) that may be associated with one or more of the determined set of electric vehicles 104A-104N. In an embodiment, the charging preference information may indicate a time period for charging a particular electric vehicle associated with the electronic device or may indicate state-of charge (SOC) information for the particular electric vehicle associated with the electronic device.

For example, in case a user (such as first user 114A) of the electronic device has a specific charging preference for the subscribed electric vehicle, the server 102 may receive such specific charging preference in the charging preference information from the corresponding electronic device associated with the user (such as first user 114A). In a first instance, the charging preference information may include a specific time period for charging, (for example between 9:00 PM and 6:00 AM), which may be preferred by the user of the corresponding electric vehicle. In such case, the server 102 may include the time period (i.e., mentioned in the charging preference information) in the determined optimal charging schedule. In a second instance, the charging preference information may indicate a specific state-of-charge (SOC) limit as the state-of-charge information (for example, 80% SOC limit) that may be preferred by the user or the corresponding electric vehicle for charging. The SOC limit may be preferred to avoid over charging of the battery of the electric vehicle. Thus, based on the preferred SOC limit and received second information about the current SOC (i.e., described at 406 at FIGS. 4 and 506 at FIG. 5), the server 102 may determine the time slot with low electricity cost and accordingly include such time slot in the optimal charging schedule for the electric vehicle.

At 522, the one or more charging control instructions may be transmitted. In an embodiment, the server 102 may transmit the one or more charging control instructions to the one or more of the determined set of electric vehicles 104A-104N, based on the received charging preference information and the determined optimal charging schedule. For example, the server 102 may transmit one or more charging control instructions as one or more charging start or charging stop instructions or commands to each of the determined set of electric vehicles 104A-104N as described, for example, at 312 in FIG. 3. In some embodiments, the server 102 may be configured to transmit the determined charging schedule to the set of electronic devices 106A-106N associated with the set of electric vehicles 104A-104N. For example, the server 102 may transmit the optimal charging schedule (i.e., determined for a particular electric vehicle) to the electronic device associated with the user of the electric vehicle. The electronic device may further display the received charging schedule on an in-built display screen (not shown) for the user, such that the user may control the electric vehicle to get charged from the corresponding electric charging facility device 110. In some embodiments, the received charging schedule may be displayed, via a software application, which may be installed on the electronic device and associated with the server 102. In an embodiment, during charging, the electronic device may receive information about the current SOC of the electric vehicle from the server 102 or from the in-vehicle infotainment system (or ECU) of the electric vehicle, and further display the information about the current SOC on the display screen.

Figure 6:
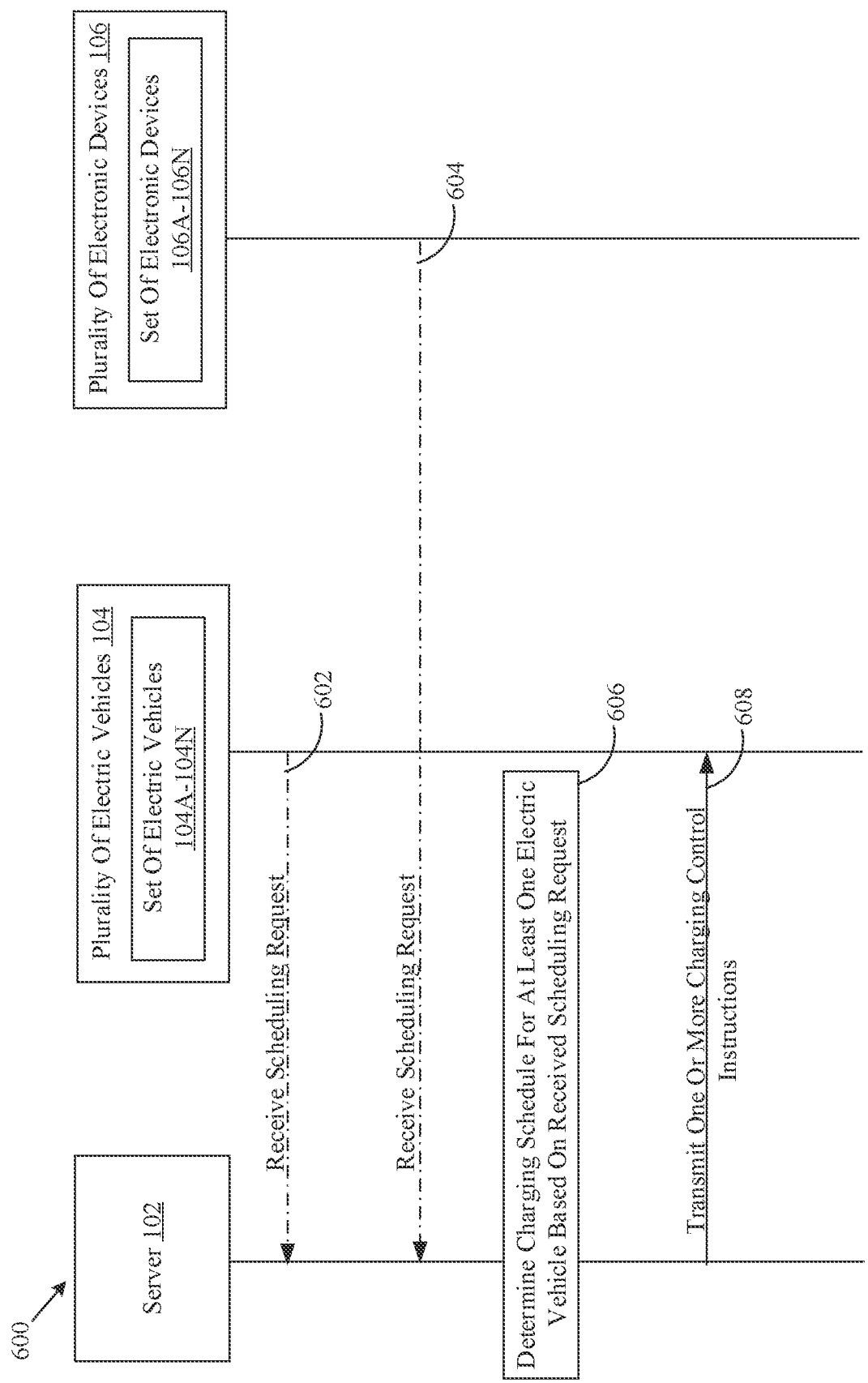
FIG. 6 is a sequence diagram that illustrates exemplary operations for receiving an on-demand charging request to schedule electric charging for vehicles by the server of FIG. 1, in accordance with an embodiment of the disclosure.

FIG. 6 is a sequence diagram that illustrates exemplary operations for receiving an on-demand charging request to schedule electric charging for vehicles by the server of FIG. 1, in accordance with an embodiment of the disclosure. FIG. 6 is explained in conjunction with elements from FIGS. 1, 2, 3, 4, and 5A-5B. With reference to FIG. 6, there is shown a sequence diagram 600 of exemplary operations handled by the server 102 or the circuitry 202 for receiving an on-demand charging request to schedule electric charging for the electric vehicles. In FIG. 6, the server 102 or the circuitry 202 may perform the exemplary operations from 602 to 608, which may relate to a reception of an on-demand charging request to further schedule electric charging for the electric vehicles associated with the received on-demand charging request.

At 602, a scheduling request from at least one electric vehicle of the plurality of electric vehicles 104 may be received. In an embodiment, the server 102 may be configured to receive the scheduling request from at least one electric vehicle of the plurality of electric vehicles 104. The one electric vehicle may be subscribed or unsubscribed with the server 102. In an embodiment, the scheduling request may include at least one of the first information, the second information or the third information. For example, in case the electric vehicle is not determined as a part of the set of electric vehicles 104A-104N (as described, for example in FIG. 4), the electric vehicle may miss out the benefits (such as cost-saving in the electricity cost) of the optimal charging schedule. In order to utilize such benefits of the charging schedule, the electric vehicle may communicate with the server 102. The server 102 may then receive the scheduling request from such electric vehicle. The scheduling request may relate to the on-demand charging request from the electric vehicle, to schedule electric charging for the electric vehicle based on the optimal charging schedule.

At 604, a scheduling request from at least one electronic device (i.e., of the plurality of electronic devices 106) associated with at least one electric vehicle of the plurality of electric vehicles 104 may be received. In another embodiment, the server 102 may be configured to receive the scheduling request from at least one electronic device (like mobile phone) that may be associated with the user of the electric vehicle (described in 602). In an embodiment, the received scheduling request may include at least one of the first information, the second information or the third information related to the electric charging of the electric vehicle. For example, in case the electronic device is not subscribed with the server 102, the associated user may miss out the benefits (such as cost-saving in the electricity cost) of the charging schedule optimally determined by the server 102. In order to provide such benefits of the charging schedule, the server 102 may receive the scheduling request from the electronic device as the on-demand charging request so that the server 102 may schedule electric charging for the related electric vehicle. In an embodiment, the received scheduling request may further include information about a duration (say certain days or weeks) for which the electric vehicle may require the optimal charging schedule from the server 102. In some embodiments, the received scheduling request may further include a location or a unique identifier of the electric charging facility device (such as electric charging facility device 110) through which the user wants to get the associated electric vehicle being charged. The server 102 may transmit the one or more charging control instructions to the electric vehicle or to the electric charging facility device 110 mentioned in the received scheduling request.

At 606, the charging schedule for at least one electric vehicle may be determined. In an embodiment, the server 102 may determine the charging schedule for at least one electric vehicle, based on the received scheduling request (i.e., either received from the electric vehicle or from the associated electronic device). Based on the received scheduling request (including the vehicle charging information), the server 102 may determine the optimal charging schedule for at least one electric vehicle from the plurality of electric vehicles 104 as described, for example, in FIGS. 5A-5B.

At 608, the one or more charging control instructions may be determined and transmitted for at least one electric vehicle. In an embodiment, the server 102 may determine the one or more charging control instructions for at least one electric vehicle, based on the received scheduling request and the determined charging schedule. Further, the server 102 may transmit the one or more charging control instructions (such as charging start or charging stop commands) to at least one electric vehicle as described, for example, at 312-314 in FIG. 3. Based on the transmitted one or more charging control instructions from the server 102 to least one electric vehicle, the user of the electric vehicle may experience benefits (such as cost-saving in the electricity cost) of the optimal charging schedule provided by the server 102, even though the electric vehicle may not be subscribed with the server 102.

Figure 7:
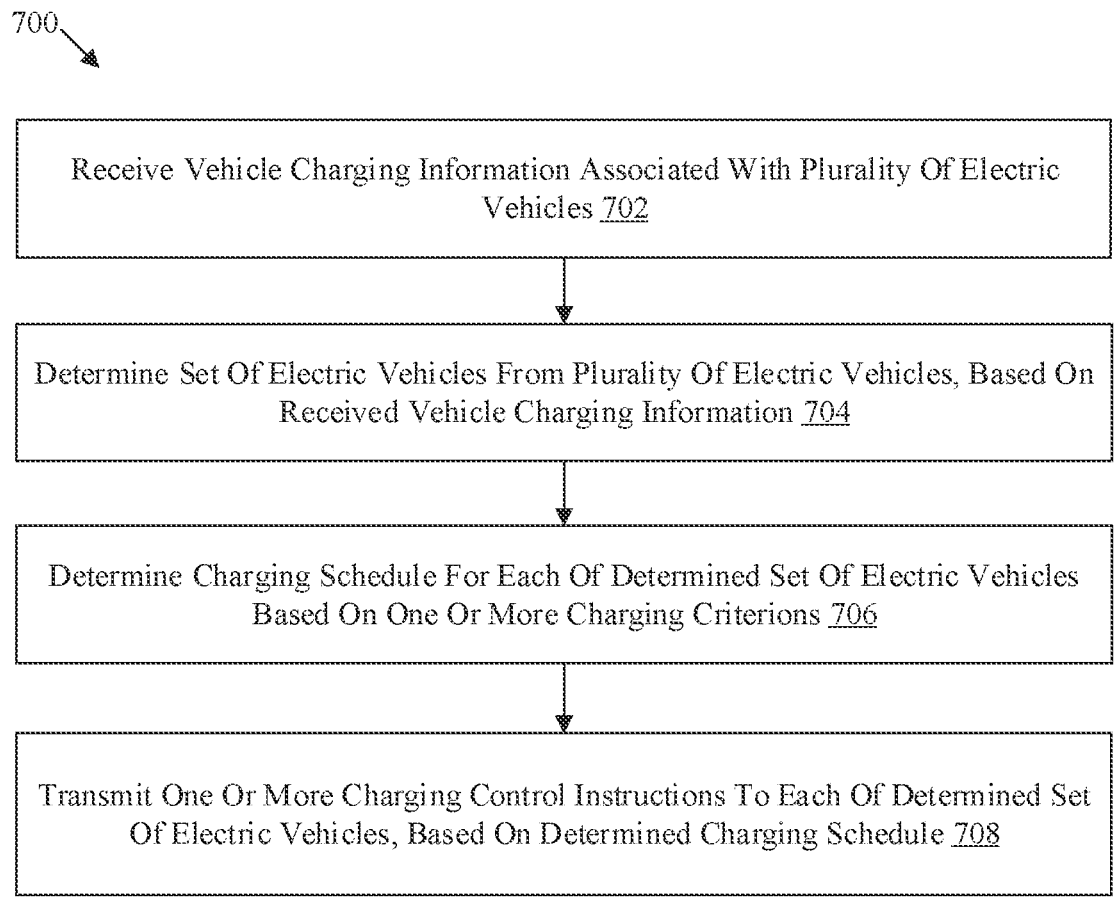
FIG. 7 is a flowchart that illustrates exemplary operations for scheduling electric charging for vehicles, in accordance with an embodiment of the disclosure.

FIG. 7 is a flowchart that illustrates exemplary operations for scheduling electric charging for vehicles, in accordance with an embodiment of the disclosure. With reference to FIG. 7, there is shown a flowchart 700. The flowchart 700 is described in conjunction with FIGS. 1, 2, 3, 4, 5A-5B, and 6. The operations from 702 to 708 may be implemented, for example, by the server 102, or the circuitry 202 of FIG. 2. The operations of the flowchart 700 may start at 702.

At 702, the vehicle charging information associated with plurality of electric vehicles 104 may be received. In accordance with an embodiment, the server 102 or the circuitry 202 may be configured to receive the vehicle charging information associated with the plurality of electric vehicles 104 as described, for example, in FIG. 3 (such as at 302).

At 704, the set of electric vehicles from the plurality of electric vehicles may be determined. In accordance with an embodiment, the server 102 or the circuitry 202 may be configured to determine the set of electric vehicles 104A-104N from the plurality of electric vehicles 104 as described, for example, in FIG. 4 (such as at 404, 406, 408, 410, and 412).

At 706, the charging schedule for each of determined set of electric vehicles 104A-104N may be determined. In accordance with an embodiment, the server 102 or the circuitry 202 may be configured to determine the charging schedule for each of determined or subscribed set of electric vehicles 104A-104N, based on one or more charging criterions as described, for example, in FIGS. 5A-5B (such as at 506, 508, 510, 512, 516, and 518).

At 708, the one or more charging control instructions may be transmitted. In accordance with an embodiment, the server 102 or the circuitry 202 may be configured to transmit one or more charging control instructions to each of the determined or subscribed set of electric vehicles 104A-104N, based on the determined charging schedule as described, for example, in FIG. 3 (such as at 312-314). Control may pass to end.

Although the flowchart 700 is illustrated as discrete operations, such as 702, 704, 706, and 708, the disclosure is not so limited. Accordingly, in certain embodiments, such discrete operations may be further divided into additional operations, combined into fewer operations, reordered, or eliminated, depending on the particular implementation without detracting from the essence of the disclosed embodiments.

Various embodiments of the disclosure may provide a non-transitory, computer-readable medium and/or storage medium, and/or a non-transitory machine readable medium and/or storage medium stored thereon, a set of instructions executable by a machine and/or a computer (for example the server 102) for scheduling charging for electric vehicles. The set of instructions may be executable by the machine and/or the computer (for example the server 102) to perform operations that may include reception of vehicle charging information associated with a plurality of electric vehicles. The vehicle charging information may include at least one of: first information related to a location of charging, second information related to a time period of charging, or third information related to state-of-charge (SOC). The operations may further include determination, based on the received vehicle charging information, a set of electric vehicles from the plurality of electric vehicles. The operations may further include determination of a charging schedule for each of the determined set of electric vehicles based on one or more charging criterions. The operations may further include transmission of one or more charging control instructions to each of the determined set of electric vehicles, based on the determined charging schedule.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted for carrying out the methods described herein may be suited. A combination of hardware and software may be a general-purpose computer system with a computer program that, when loaded and executed, may control the computer system such that it carries out the methods described herein. The present disclosure may be realized in hardware that includes a portion of an integrated circuit that also performs other functions. It may be understood that, depending on the embodiment, some of the steps described above may be eliminated, while other additional steps may be added, and the sequence of steps may be changed.

The present disclosure may also be embedded in a computer program product, which includes all the features that enable the implementation of the methods described herein, and which when loaded in a computer system is able to carry out these methods. Computer program, in the present context, means any expression, in any language, code or notation, of a set of instructions intended to cause a system with an information processing capability to perform a particular function either directly, or after either or both of the following: a) conversion to another language, code or notation; b) reproduction in a different material form. While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure is not limited to the particular embodiment disclosed, but that the present disclosure will include all embodiments that fall within the scope of the appended claims.

What is claimed is:

1. A system for scheduling electric charging for electric vehicles, comprising:
 a memory storing instructions when executed by a processor cause the processor to:
  receive vehicle identification information and vehicle charging information associated with a plurality of electric vehicles from at least one of the plurality of electric vehicles and electronic devices associated with the plurality of electric vehicles, wherein the vehicle charging information comprises at least one of: first information related to a location of charging, second information related to a time period of charging, or third information related to state-of-charge (SOC);
  determine, based on the vehicle identification information, subscription status for each of the plurality of electric vehicles, wherein the subscription status is a status of whether an electric vehicle is subscribed to receive electric charging schedules from a server;
  select electric vehicles from the plurality of electric vehicles that are not subscribed to the server;
  determine, based on the received vehicle charging information, a set of electric vehicles from the selected electric vehicles;
  transmit charging subscription information, including a subscription request for a predetermined time period, to a portion of the electronic devices associated with the plurality of electric vehicles, wherein each electronic device in the portion is associated with a respective electric vehicle from the set of electric vehicles;
  receive acceptance information, including acceptance of the subscription request for the predetermined time period, from one or more electronic devices in the portion of the electronic devices;
  determine, based on the received acceptance information, a subscribed set of electric vehicles from the set of electric vehicles, and determine a charging schedule for each vehicle in the subscribed set of electric vehicles based on one or more charging criterions;
  determine one or more charging control instructions based on the charging schedule; and
  transmit, based on the charging schedule, the one or more charging control instructions to vehicles of the subscribed set of electric vehicles to electronically control electric charging of the vehicles of the subscribed set of electric vehicles based on the one or more charging control instructions during the predetermined time period.

2. The system according to claim 1, wherein the processor is further configured to:
 determine cost information for electric charging at the location of each of the plurality of electric vehicles; and
 determine the set of electric vehicles from the selected electric vehicles, based on the determined cost information.

3. The system according to claim 1, wherein the processor is further configured to:
 compare the third information related to the state-of-charge (SOC) for each of the plurality of electric vehicles with a state-of-charge (SOC) threshold; and
 determine the set of electric vehicles from the selected electric vehicles, based on the comparison.

4. The system according to claim 1, wherein the one or more charging criterions indicate cost information for electric charging at the location of charging of each vehicle of the subscribed set of electric vehicles, and wherein the processor is further configured to determine the charging schedule for each vehicle of the subscribed set of electric vehicles based on the cost information.

5. The system according to claim 1, wherein the one or more charging criterions indicate a number of electric grids available at the location of charging of each vehicle of the subscribed set of electric vehicles, and wherein the processor is further configured to determine the charging schedule for each vehicle of the subscribed set of electric vehicles based on the number of electric grids.

6. The system according to claim 1, wherein the one or more charging criterions indicate a number of electric vehicles at the location of charging of each vehicle of the subscribed set of electric vehicles, and wherein the processor is further configured to determine the charging schedule for each vehicle of the subscribed set of electric vehicles based on the number of electric vehicles.

7. The system according to claim 1, wherein the one or more charging criterions are based on the second information related to the time period of charging for each vehicle of the subscribed set of electric vehicles, and wherein the processor is further configured to determine the charging schedule for each vehicle of the subscribed set of electric vehicles based on the second information.

8. The system according to claim 1, wherein the one or more charging criterions are based on the third information related to the state-of-charge (SOC) for each vehicle of the subscribed set of electric vehicles, and wherein the processor is further configured to determine the charging schedule for each vehicle of the subscribed set of electric vehicles based on the third information.

9. The system according to claim 1, wherein the circuitry processor is further configured to:
receive charging preference information from the one or more electronic devices in the portion of the electronic devices, wherein the charging preference information indicates a preferred time period of charging or a preferred state-of-charge; and
transmit, based on the charging schedule and the received charging preference information, the one or more charging control instructions to the vehicles of the subscribed set of electric vehicles.

10. The system according to claim 1, wherein the processor is further configured to: transmit, based on the charging schedule, summary information to the one or more electronic devices in the portion of the electronic devices, and wherein the summary information indicates at least one of: an amount of cost saved, an amount of reduction of carbon dioxide in an environment, a number of charging sessions, a total amount of electric charging performed based on the charging schedule.

11. The system according to claim 1, wherein the processor is further configured to: transmit, based on the charging schedule, summary information to the one or more electronic devices in the portion of the electronic devices, and wherein the summary information indicates a recommendation to change at least one of: charging preference, the location of charging, or a faulty charging component.

12. The system according to claim 1, wherein the processor is further configured to: transmit the one or more charging control instructions to at least one electric charging facility device associated with each vehicle of the subscribed set of electric vehicles, based on the charging schedule.

13. The system according to claim 1, wherein the processor is further configured to:
receive a scheduling request from at least one electric vehicle of the plurality of electric vehicles or from an electronic device associated with the at least one electric vehicle, wherein the scheduling request includes at least one of: a requested location of charging, a requested time period of charging, or a requested state-of-charge;
determine a requested charging schedule for the at least one electric vehicle based on the received scheduling request; and
transmit the one or more charging control instructions to the at least one electric vehicle, based on the requested charging schedule.

14. A computer-implemented method for scheduling electric charging for electric vehicles, comprising:
receiving vehicle identification information and vehicle charging information associated with a plurality of electric vehicles from at least one of the plurality of electric vehicles and electronic devices associated with the plurality of electric vehicles, wherein the vehicle charging information comprises at least one of: first information related to a location of charging, second information related to a time period of charging, or third information related to state-of-charge;
determining, based on the vehicle identification information, subscription status for each of the plurality of electric vehicles, wherein the subscription status is a status of whether an electric vehicle is subscribed to receive electric charging schedules from a server;
determining, based on the received vehicle charging information and the subscription status, a set of electric vehicles from the plurality of electric vehicles that are not subscribed to the server;
transmitting charging subscription information, including a subscription request for a predetermined time period, to a portion of the electronic devices associated with the plurality of electric vehicles, wherein each electronic device in the portion is associated with a respective electric vehicle from the set of electric vehicles;
receiving acceptance information, including acceptance of the subscription request for the predetermined time period, from one or more electronic devices in the portion of the electronic devices;
determining a subscribed set of electric vehicles from the set of electric vehicles based on the received acceptance information, and determining a charging schedule for each vehicle in the subscribed set of electric vehicles based on one or more charging criterions;
determining one or more charging control instructions based on the charging schedule; and
transmitting, based on the received acceptance information, the one or more charging control instructions to vehicles of the subscribed set of electric vehicles to electronically control electric charging of the vehicles of the subscribed set of electric vehicles based on the one or more charging control instructions during the predetermined time period.

15. The method according to claim 14, further comprising:
receiving charging preference information from one or more vehicles of the subscribed set of electric vehicles, wherein the charging preference information indicates a preferred time period of charging or a preferred state-of-charge; and
transmitting, based on the charging schedule and the received charging preference information, the one or more charging control instructions to the one or more vehicles of the subscribed set of electric vehicles.

16. A non-transitory computer-readable medium having stored thereon, computer-executable instructions which, when executed by a computer which includes a processor performs a method, the method comprising:
receiving vehicle identification information and vehicle charging information associated with a plurality of electric vehicles from at least one of the plurality of electric vehicles and electronic devices associated with the plurality of electric vehicles, wherein the vehicle charging information comprises at least one of: first information related to a location of charging, second information related to a time period of charging, or third information related to state-of-charge;
determining, based on the vehicle identification information, subscription status for each of the plurality of electric vehicles, wherein the subscription status is a status of whether an electric vehicle is subscribed to receive electric charging schedules from a server;

determining, based on the received vehicle charging information and the subscription status, a set of electric vehicles from the plurality of electric vehicles, wherein the set of electric vehicles are not subscribed to the server;

transmitting charging subscription information, including a subscription request for a predetermined time period, to a portion of the electronic devices associated with the plurality of electric vehicles, wherein each electronic device in the portion is associated with a respective electric vehicle from the set of electric vehicles;

receiving acceptance information, including acceptance of the subscription request for the predetermined time period, from one or more electronic devices in the portion of the electronic devices;

determining, based on the received acceptance information, a subscribed set of electric vehicles from the set of electric vehicles, and determining a charging schedule for each vehicle in the subscribed set of electric vehicles based on one or more charging criterions;

determining one or more charging control instructions based on the charging schedule; and transmitting, based on the received acceptance information, the one or more charging control instructions to vehicles of the subscribed set of electric vehicles to electronically control electric charging of the vehicles of the subscribed set of electric vehicles based on the one or more charging control instructions during the predetermined time period.

* * * * *